(12) United States Patent
Lee

(10) Patent No.: US 9,826,342 B2
(45) Date of Patent: Nov. 21, 2017

(54) METHOD FOR CONTROLLING SOUND OUTPUT AND AN ELECTRONIC DEVICE THEREOF

(71) Applicant: Samsung Electronics Co., Ltd., Suwon-si, Gyeonggi-do (KR)

(72) Inventor: Jae-Hyeok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/091,098

(22) Filed: Apr. 5, 2016

(65) Prior Publication Data

US 2016/0302027 A1 Oct. 13, 2016

(30) Foreign Application Priority Data

Apr. 8, 2015 (KR) .................. 10-2015-0049603

(51) Int. Cl.
| | |
|---|---|
| *H04B 7/00* | (2006.01) |
| *H04W 4/00* | (2009.01) |
| *G10L 15/26* | (2006.01) |
| *H04B 1/3827* | (2015.01) |
| *H04M 1/60* | (2006.01) |
| *H04M 1/725* | (2006.01) |

(52) U.S. Cl.
CPC .......... *H04W 4/008* (2013.01); *G10L 15/265* (2013.01); *H04B 1/385* (2013.01); *H04M 1/6066* (2013.01); *H04M 1/7253* (2013.01); *H04M 1/72569* (2013.01); *H04M 2250/02* (2013.01); *H04M 2250/12* (2013.01)

(58) Field of Classification Search
CPC ..... H04W 4/008; H04B 1/385; H04M 1/7253

USPC ................................ 455/41.3, 41.2
See application file for complete search history.

(56) References Cited

U.S. PATENT DOCUMENTS 8,706,162 B1 * 4/2014 Abrahamsson ....... H04M 1/605
455/556.1
9,467,403 B2 * 10/2016 Chen ...................... H04L 51/04
(Continued)

FOREIGN PATENT DOCUMENTS

| EP | 2768209 A1 | 8/2014 |
|---|---|---|
| KR | 10-0669048 B1 | 1/2007 |
| WO | 0057616 A2 | 9/2000 |

OTHER PUBLICATIONS

The General and Device-Specific Inquiry Access Codes (DIACs), https://www.bluetooth.com/specifications/assigned-numbers/baseband.

*Primary Examiner* — April G Gonzales
(74) *Attorney, Agent, or Firm* — Jefferson IP Law, LLP

(57) ABSTRACT

A method of controlling a call and an electronic device for performing the method are provided. The electronic device includes a communication unit for establishing a communication link with respect to at least one external electronic device, a sensor module configured to detect at least one piece of sensor data, and a controller configured to select at least one device for outputting a sound from at least one of the electronic device, and the external electronic device, the selection made on the basis of at least one of the at least one piece of sensor data detected through the sensor module, and situation information of the at least one external electronic device, in a state of being connected to the at least one external electronic device. In addition, other embodiments are also possible.

20 Claims, 18 Drawing Sheets

(56) References Cited

U.S. PATENT DOCUMENTS

| | | | |
|---|---|---|---|
| 2013/0227179 A1* | 8/2013 | Kalayjian | G06F 1/1698 710/36 |
| 2014/0150010 A1* | 5/2014 | Jeon | G08C 17/02 725/30 |
| 2015/0350306 A1* | 12/2015 | Dryden | H04L 67/10 709/203 |

* cited by examiner

METHOD FOR CONTROLLING SOUND OUTPUT AND AN ELECTRONIC DEVICE THEREOF

CROSS-REFERENCE TO RELATED APPLICATION(S)

This application claims the benefit under 35 U.S.C. §119 (a) of a Korean patent application filed on Apr. 8, 2015 in the Korean Intellectual Property Office and assigned Serial number 10-2015-0049603, the entire disclosure of which is hereby incorporated by reference.

TECHNICAL FIELD

The present disclosure relates to a method for controlling a sound output in an electronic device, and the electronic device thereof.

BACKGROUND

Recently, with the rapid development of electronic devices, an electronic device capable of providing wireless voice calls and information exchanges is becoming necessities of life. Electronic devices have generally been regarded as portable devices providing wireless calls according to the related art. However, along with technical advances and the introduction of the wireless Internet, the electronic devices are now used for many other purposes in addition to simple telephone calls or scheduling. For example, the electronic device provides a variety of functions to satisfy users' demands, such as, games, remote controlling using short-distance communications, capturing images using a built-in digital camera.

In addition, the electronic device may establish a communication link with respect to an external electronic device by using the short-distance communications, and may share data including a voice with respect to another external electronic device.

The above information is presented as background information only to assist with an understanding of the present disclosure. No determination has been made, and no assertion is made, as to whether any of the above might be applicable as prior art with regard to the present disclosure.

SUMMARY

According to the technique, when an electronic device receives a call in a situation in which the electronic device is connected to an external electronic device by using a short-distance wireless communication scheme, even if a user accepts an incoming call by using the electronic device, a sound path is established to the external electronic device according to the related art. Therefore, the user of the electronic device may have a difficulty in changing the sound path by selecting an additional menu to make a call by the use of the electronic device.

Aspects of the present disclosure are to address at least the above-mentioned problems and/or disadvantages and to provide at least the advantages described below. Accordingly, an aspect of the present disclosure is to provide an apparatus and method for outputting a sound to at least one of an electronic device and at least one external electronic device connected to the electronic device by using a short-distance wireless communication scheme on the basis of situation information.

In accordance with an aspect of the present disclosure, an electronic device is provided. The electronic device includes a communication unit for establishing a communication link with respect to at least one external electronic device, a sensor module configured to detect at least one piece of sensor data, and a controller for selecting at least one device for outputting a sound from the electronic device and/or the external electronic device on the basis of the at least one piece of sensor data detected through the sensor module and/or situation information of the at least one external electronic device, in a state of being connected to the at least one external electronic device.

According to the various embodiments, a computer readable recording medium may store a program for executing operations of establishing a communication link with respect to at least one external electronic device, detecting at least one piece of sensor data, and selecting at least one device for outputting a sound from the electronic device and/or the external electronic device on the basis of the detected at least one piece of sensor data and/or situation information of the at least one external electronic device, in a state of being connected to the at least one external electronic device.

In accordance with an aspect of the present disclosure, a method of controlling an output is provided. The method includes connecting to at least one external electronic device, detecting at least one piece of sensor data, and selecting a device for outputting a sound from the electronic device and/or the external electronic device on the basis of the detected at least one piece of sensor data and/or situation information of the at least one external electronic device, in a state of being connected to the at least one external electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
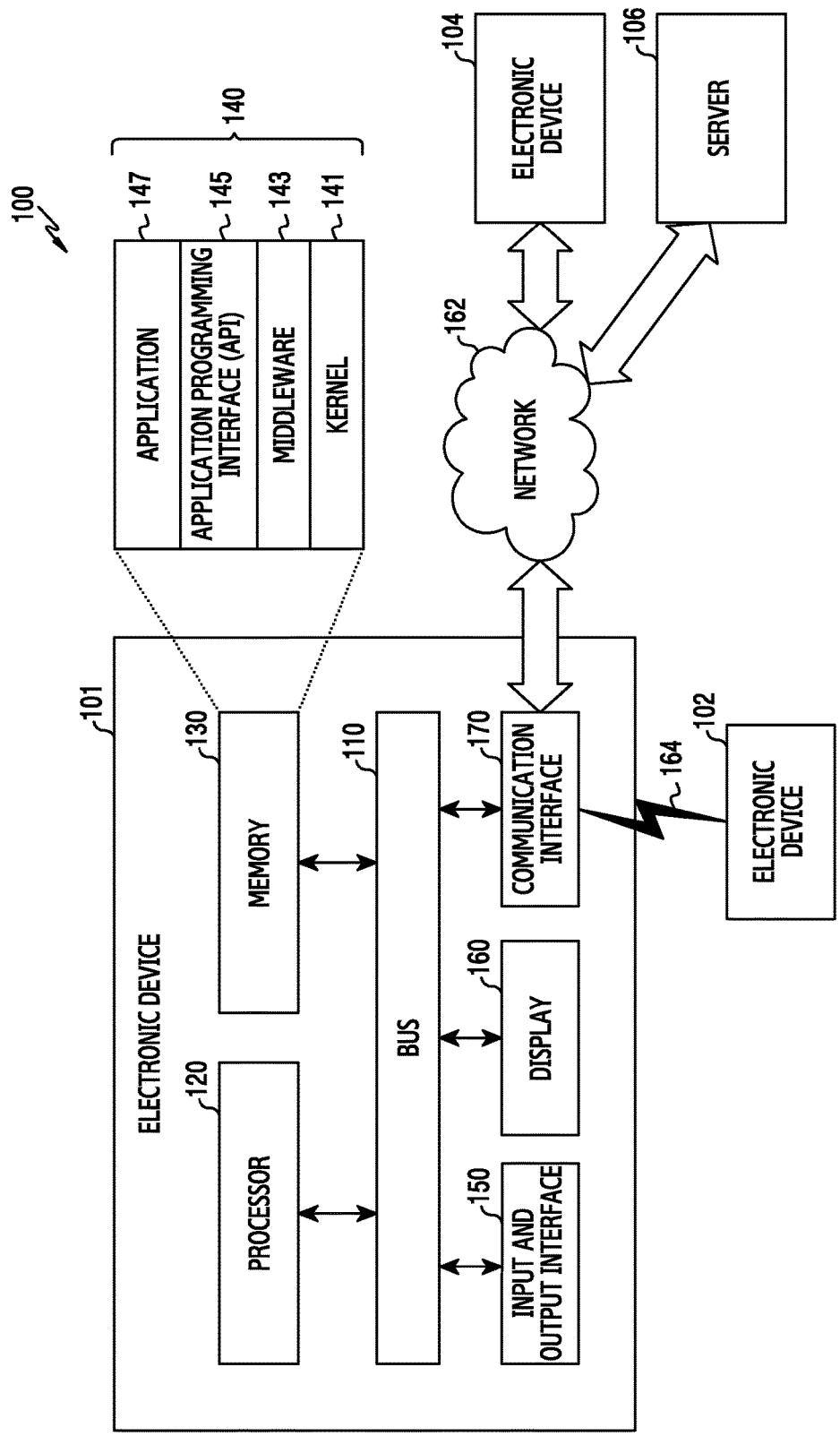
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although terms such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be referred to as a second element without departing from the scope of various embodiments of the present disclosure, and similarly, a second element may be referred to as a first element.

It will be understood that when an element (e.g., first element) is "connected to" or "(operatively or communicatively) coupled with/to" another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to the situation. The term "configured to (set to)" does not necessarily mean "specifically designed to" at a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a general-purpose processor, e.g., a central processing unit (CPU) or an application processor (AP), capable of performing a corresponding operation by executing one or more software programs stored in a memory device.

The terms and expressions as used herein are used merely to describe certain embodiments and do not limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, or a wearable device (e.g., a head-mount-device (HMD), electronic eye-glasses, electronic clothing, an electronic bracelet, an electronic necklace, an electronic appcessory, an electronic tattoo, a smart mirror, or a smart watch).

An electronic device according to various embodiments of the present disclosure may be a smart home appliance and may include a television (TV), a digital versatile disc (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ PlayStation™), an electronic dictionary, an electronic key, a camcorder, or an electronic frame.

An electronic device according to various embodiments of the present disclosure may include a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine), a navigation device, a Global Navigation Satellite System (GNSS) receiver, a global positioning system (GPS) receiver, an event data recorder (EDR), a flight data recorder (FDR), an in-vehicle infotainment device, an electronic equipment for a ship (e.g., ship navigation equipment and/or a gyrocompass), an avionics equipment, a security equipment, a head unit for vehicle, an industrial or home robot, an automatic teller machine (ATM), point of sale (POS) terminal, or an Internet of Things (IoT) device (e.g., a lightbulb, various sensors, an electronic meter, a gas meter, a sprinkler, a fire alarm, a thermostat, a streetlamp, a toaster, a sporting equipment, a hot-water tank, a heater, a boiler and the like).

An electronic device according to various embodiments of the present disclosure may include at least one of a piece of furniture or a building/structure, an electronic board, an electronic signature receiving device, a projector, and various measuring instruments (e.g., a water meter, an electricity meter, a gas meter, or a wave meter).

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a view illustrating a network environment 100 including an electronic device 101 according to various embodiments of the present disclosure. Referring to FIG. 1, the electronic device 101 includes a bus 110, a processor 120, a memory 130, an input/output (I/O) interface 150, a display 160, and a communication interface 170.

The bus 110 may be a circuit for connecting the above-described elements with each other, and transferring communication (e.g., a control message) between the above-described elements.

The processor 120 may include a CPU, a communication processor (CP), a graphic processing unit (GPU).

The processor 120 may receive, for example, an instruction from the above-described other elements (e.g., the memory 130, the I/O interface 150, the display 160, or the communication interface 170, etc.) via the bus 110, interpret the received instruction, and execute an operation or a data process corresponding to the instruction.

The memory 130 may include volatile and/or non-volatile memory. The memory 130 may store an instruction or data received from the processor 120 or other elements (e.g., the I/O interface 150, the display 160, or the communication interface 170, etc.), or generated by the processor 120 or other elements. The memory 130 includes programming modules 140 such as a kernel 141, a middleware 143, an application programming interface (API) 145, or an application 147. Each of the programming modules may be configured using software, firmware, hardware, or a combination of two or more.

The kernel 141 may control or manage system resources (e.g., the bus 110, the processor 120, or the memory 130, etc.) used for executing an operation or a function implemented in the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a role so that the API 145 or the application 147 may communicate with the kernel 141 to send and receive data. Also, in connection with task requests received from the application 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 147.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may transfer an instruction or data input from a user via an I/O unit (e.g., a sensor, a keyboard, or a touchscreen) to the processor 120, the memory 130, or the communication interface 170 via the bus 110. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O interface 150 (e.g., a speaker or a display). For example, the I/O interface 150 may output voice data processed by the processor 120 to a user via a speaker.

The display 160 may include, for example, a liquid crystal display (LCD), a light emitting diode (LED) display, an organic light emitting diode (OLED) display, a Micro Electro Mechanical System (MEMS) display, or an electronic paper display. The display 160 may display various types of content (for example, text, images, videos, icons, or symbols) to users. The display 160 may include a touch screen, and may receive, for example, a touch, gesture, proximity, or hovering input by using an electronic pen or a part of the user's body.

The communication interface 170 may communicate between the electronic device 101 and an external device (for example, the electronic device 104 or the server 106). For example, the communication interface 170 may be connected to a network 162 through wireless communication or wired communication, and may communicate with an external device.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM) as a cellular communication protocol.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a local area network (LAN) or a wireless area network (WAN)), the Internet, and a telephone network.

The electronic devices 102 and 104 may be devices of the same type as the electronic device 101 or different types from that of the electronic device 101. According to an embodiment of the present disclosure, the server 106 may include a group of one or more servers. All or some of the operations executed in the electronic device 101 may be carried out in another electronic device or a plurality of electronic devices (for example, the electronic devices 102, 104 or the server 106). When the electronic device 101 performs functions or services automatically or by request, the electronic device 101 may make a request for performing at least some functions related to the functions or services to another device 102, 104, or the server 106 instead of performing the functions or services by itself or additionally. The electronic device 102, 104, or the server 106 may carry out the functions requested by the electronic device 101 or additional functions and provide the results to the electronic device 101. The electronic device 101 may provide the requested functions or services to another electronic device based on the received results or after additionally processing the received results. To this end, cloud computing, distributed computing, or client-server computing technology may be used.

Figure 2:
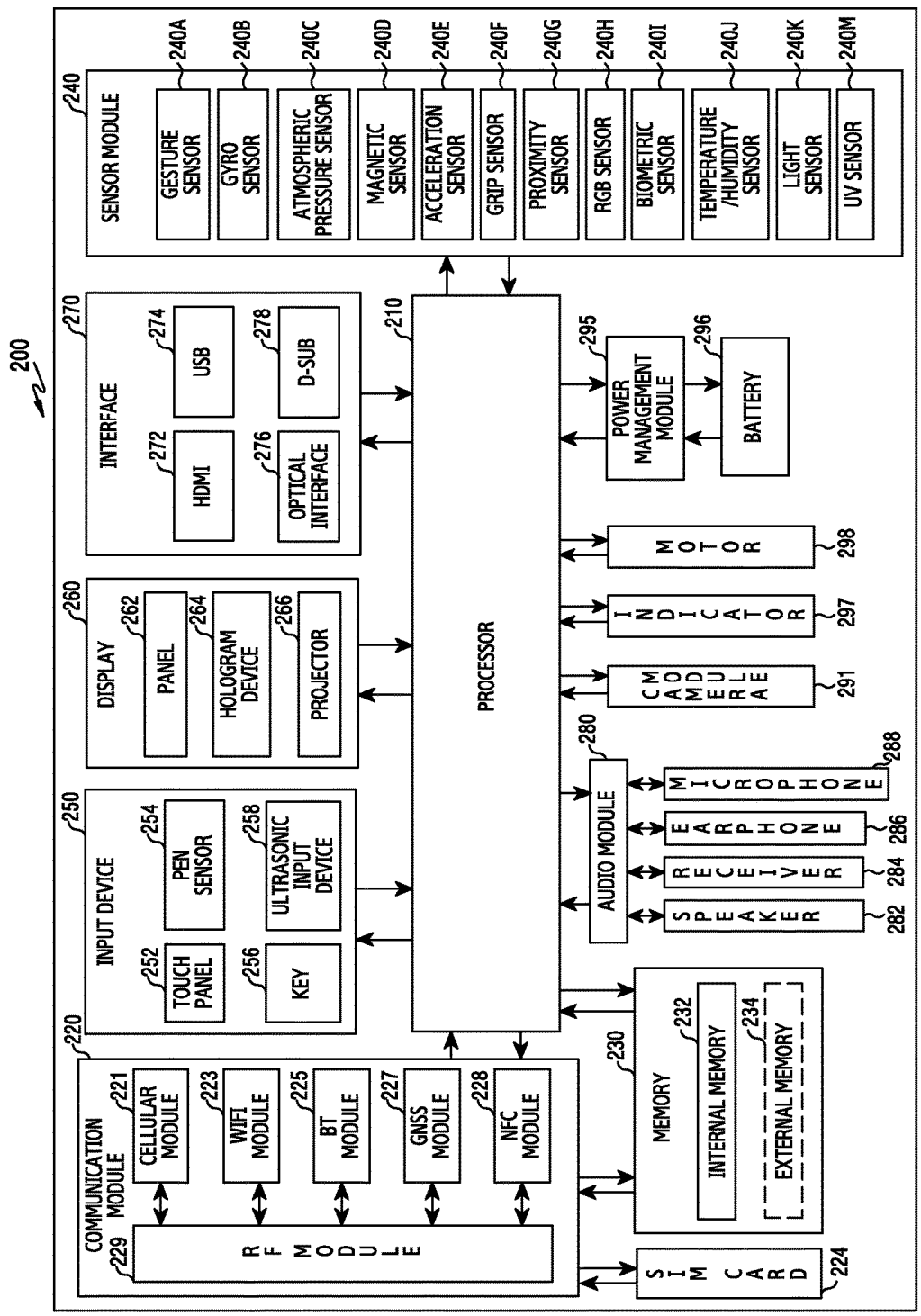
FIG. 2 is a block diagram of an electronic device according to various embodiments of the present disclosure.

FIG. 2 is a block diagram 200 illustrating an electronic device 201 according to various embodiments of the present disclosure. The electronic device 201 may include, for example, all or a portion of the electronic device 101 illustrated in FIG. 1. Referring to FIG. 2, the electronic device 201 includes one or more AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may drive an OS or an application to control a plurality of hardware or software elements connected to the AP 210, and perform various data processing including multimedia data and operations. The AP 210 may be implemented, for example, as a system on chip (SoC). According to an embodiment of the present disclosure, the AP 210 may further include at least one of a GPU or image signal processor. The AP 210 may be implemented to include at least a portion (e.g., the cellular module 221) of the above-described elements. Also, the AP 210 may store data received from at least one of other elements or generated by at least one other element in a non-volatile memory.

The communication module 220 (e.g., the communication interface 170) may perform data transmission/reception in communication between the electronic device 201 and other electronic devices 102, 104 or the server 106 connected via a network. The communication module 220 includes a cellular module 221, a Wi-Fi module 223, a BT module 225, a GNSS module 227, a near field communication (NFC) module 228, and a radio frequency (RF) module 229.

The cellular module 221 may provide voice communication, image communication, a short message service, or an Internet service, etc. via a communication network (e.g., LTE, LTE-A, CDMA, WCDMA, UMTS, (WiBro), and GSM). Also, the cellular module 221 may perform authentication of an electronic device within a communication network using, for example, a subscriber identify module (e.g., a SIM card 224). The cellular module 221 may perform at least a portion of functions that may be provided by the AP 210. The cellular module 221 may include a CP. Also, the cellular module 221 may be, for example, implemented as an SoC. Though elements such as the cellular module 221 (e.g., a communication processor), the memory 230, or the power management module 295, etc. are illustrated as elements separated from the AP 210 in FIG. 2, the AP 210 may be implemented to include at least a portion (e.g., the cellular module 221) of the above-described elements.

Each of the Wi-Fi module 223, the BT module 225, the GNSS module 227, or the NFC module 228 may include, for example, a processor for processing data transmitted/received via a relevant module. Though the cellular module 221, the Wi-Fi module 223, the BT module 225, the GNSS module 227, and the NFC module 228 are illustrated as separate blocks in FIG. 2, at least a portion (e.g., two or more elements) of the cellular module 221, the Wi-Fi module 223, the BT module 225, the GNSS module 227, and the NFC module 228 may be included in one integrated circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GNSS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc. Also, the RF module 229 may further include a part for transmitting/receiving an electromagnetic wave in free space in wireless communication, for example, a waveguide. Though FIG. 2 illustrates the cellular module 221, the Wi-Fi module 223, the BT module 225, the GNSS module 227, and the NFC module 228 share one RF module 229, at least one of the cellular module 221, the Wi-Fi module 223, the BT module 225, the GNSS module 227, or the NFC module 228 may perform transmission/reception of an RF signal via a separate RF module.

The SIM card 224 may be include a subscriber identify module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 130) includes a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment of the present disclosure, the built-in memory 232 may be a solid state drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. The electronic device 201 may further include a storage device (or a storage medium) such as a hard drive.

The sensor module 240 may measure a physical quantity or detect an operation state of the electronic device 201, and convert the measured or detected information to an electric signal. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illuminance sensor 240K, and an ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, or a fingerprint sensor, etc. The sensor module 240 may further include a control circuit for controlling at least one sensor belonging thereto.

The input device 250 includes a touch panel 252, a (digital) pen sensor 254, a key 256, and an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone 288 in the electronic device 201 via an input tool generating an ultrasonic signal. The electronic device 201 may receive a user input from an external device (e.g., a computer or a server) connected to the communication module 220 using the communication module 220.

The display 260 (e.g., the display 160) includes a panel 262, a hologram device 264, and a projector 266. The panel 262 may be, for example, a LCD, or an active-matrix organic light-emitting diode (AM-OLED), etc. The panel 262 may be implemented as flexible, transparent, or wearable. The panel 262 may be configured as one module together with the touch panel 252. The hologram device 264 may show a three-dimensional image in the air using interference of light. The projector 266 may project light onto a screen to display an image. The screen may be positioned, for example, inside or outside the electronic device 201. The display 260 may further include a control circuit for controlling the panel 262, the hologram device 264, or the projector 266.

The interface 270 includes a HDMI 272, a USB 274, an optical interface 276, and a D-subminiature (D-sub) 278. The interface 270 may be included, for example, in the communication interface 160 illustrated in FIG. 1. Additionally or alternatively, the interface 270 may include, for example, a mobile high-definition link (MHL) interface, a SD card/multi-media card (MMC) interface, or an infrared data association (IrDA) standard interface.

The audio module 280 may convert a sound into an electric signal bidirectionally. At least a partial element of the audio module 280 may be included, for example, in the I/O interface 150 illustrated in FIG. 1. The audio module 280 processes sound information input or output via a speaker 282, a receiver 284, an earphone 286, or the microphone 288, etc.

The camera module 291 is a device that may shoot a still image and a moving picture. The camera module 291 may include one or more image sensors (e.g., a front sensor or a rear sensor), a lens, an image signal processor (ISP), or a flash (e.g., an LED or xenon lamp).

The power management module 295 may manage power of the electronic device 201. The power management module 295 may include, for example, a power management integrated circuit (PMIC), a charger IC, or a battery or a battery gauge.

The PMIC may be mounted, for example, inside an integrated circuit or an SoC. A charging method may be classified into a wired charging method and a wireless charging method. The charging IC may charge a battery and prevent overvoltage or overcurrent from a charger. The charging IC may include a charging IC for at least one of the wired charging method and the wireless charging method. The wireless charging method may be, for example, a magnetic resonance method, a magnetic induction method, or an electromagnetic wave method, etc., and may additionally include a circuit for wireless charging, for example, a circuit such as a coil loop, a resonance circuit, or a rectifier, etc.

The battery gauge may measure, for example, a remaining charge of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal into mechanical vibration. Though not shown, the electronic device 201 may include a processor (e.g., a GPU) for supporting a mobile TV. The processor for supporting the mobile TV may process media data corresponding to standards such as digital multimedia broadcasting (DMB), digital video broadcasting (DVB), or Mediaflo™, etc.

The aforementioned elements of the electronic device according to various embodiments of the present disclosure may be constructed by one or more components, and the name of the corresponding element may vary with a type of electronic device. The electronic device may include at least one of the aforementioned elements. Some elements may be omitted or other additional elements may be further included in the electronic device. Further, some of the components of the electronic device may be combined to form a single entity, and thus, may equivalently execute functions of the corresponding elements prior to the combination.

Figure 3:
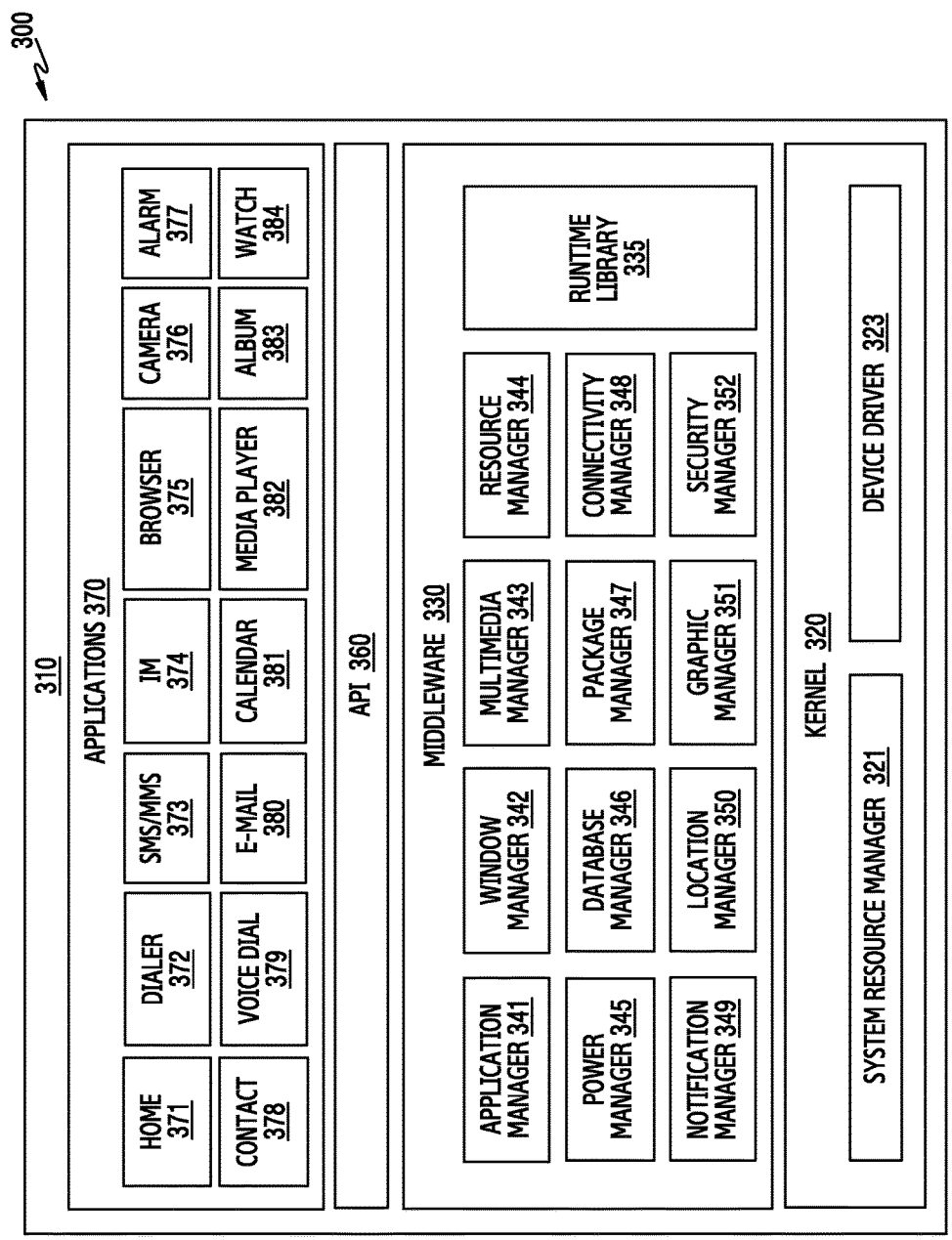
FIG. 3 is a block diagram of a program module according to various embodiments of the present disclosure.

FIG. 3 is a block diagram 300 of a program module 310 according to various embodiments of the present disclosure.

The program module 310 (for example, the programs 140) may include an operating system (OS) for controlling resources related to the electronic device (for example, the electronic device 101) and/or various applications (for example, the application 147) executed in the operating system. The operating system may be, for example, Android™, iOS™, Windows™, Symbian™, Tizen™, Bada™, and the like.

The program module 310 includes a kernel 320, middleware 330, an API 360, and/or applications 370. At least some of the program module 310 may be preloaded in the electronic device or downloaded from the server 106.

The kernel 320 (for example, the kernel 141 of FIG. 1) includes a system resource manager 321 and a device driver 323. The system resource manager 321 may control, allocate, or collect the system resources. The system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function used by the applications 370 in common or provide various functions to the applications 370 through the API 360 so that the applications 370 may efficiently use limited system resources within the electronic device. According to an embodiment of the present disclosure, the middleware 330 (for example, the middleware 143) includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while an application of the applications 370 is executed. The runtime library 335 may perform input/output management, memory management, or an arithmetic function.

The application manager 341 may manage, for example, a life cycle of at least one of the applications 370. The window manager 342 may manage graphical user interface (GUI) resources used by a screen. The multimedia manager 343 may provide formats used for the reproduction of various media files, and may perform an encoding or decoding of the media file by using a codec suitable for the corresponding format. The resource manager 344 may manage resources such as source code, memory, and storage space of at least one of the applications 370.

The power manager 345 may operate together with a basic input/output system (BIOS) to manage a battery or power and may provide power information used for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 may display or notify a user of an event such as an arrival message, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide one or more security functions used for system security or user authentication. When the electronic device 101 has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android™ or iOS™ may provide one API set per platform, and Tizen™ may provide two or more API sets per platform.

The applications 370 includes one or more applications which may provide functions such as home 371, dialer 372, short message service (SMS)/multimedia messaging service (MMS) 373, instant message (IM) 374, browser 375, camera 376, alarm 377, contact 378, voice dial 379, email 380, calendar 381, media player 382, album 383, watch 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application") supporting information exchange between the electronic device 101 and an external electronic device 102, 104. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 101 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment of the present disclosure, the applications 370 may include an application (for example, health management application) designated according to attributes of the external electronic device (for example, attributes of the electronic device such as the type of electronic device which corresponds to a mobile medical device). The applications 370 may include an application received from the external electronic devices (for example, the server 106 or the external electronic devices 102, 104). The applications 370 may include a preloaded application or a third party application which may be downloaded from the server. The names of the components of the program module 310 illustrated in FIG. 3 may vary according to the type of operating system.

According to various embodiments of the present disclosure, at least some of the program module 310 may be implemented by software, firmware, hardware, or a combination of two or more thereof. At least some of the program module 310 may be implemented (for example, executed) by the processor (for example, the application program). At least some of the program module 310 may include, for example, a module, program, routine, sets of instructions, or process for performing one or more functions.

The term "module" as used in the present disclosure may refer to a unit including a combination of hardware, software, or firmware. The term "module" may be interchangeably used with the terms unit, logic, logical block, component, or circuit, etc. A "module" may be a minimum unit of an integrally configured part or a portion thereof. A "module" may be a minimum unit performing one or more functions or a portion thereof. A "module" may be mechanically or electronically implemented. For example, a "module" may include at least one of an application-specific integrated circuit (ASIC) chip, field-programmable gate arrays (FPGAs), or a programmable-logic device which are known, or to be developed in the future, and perform certain operations.

According to various embodiments of the present disclosure, at least a portion of a device (e.g., modules or functions thereof) or a method (e.g., operations) according to the present disclosure may be implemented as an instruction stored in a computer-readable storage media, for example, in the form of a programming module. An instruction, when executed by one or more processors (e.g., the processor 120), may allow the one or more processors to perform a function corresponding to the instruction. The computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The computer-readable storage media may include a hard disk, a magnetic media such as a floppy disk and a magnetic tape, compact disc read only memory (CD-ROM), optical media such as digital versatile disc (DVD), magneto-optical media such as a floptical disk, and a hardware device specially configured for storing and performing a program instruction (e.g., a programming module) such as read only memory (ROM), random access memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure.

A module or a programming module according to an embodiment of the present disclosure may include at least one of the above-described elements, omit a portion thereof, or further include additional elements. Operations performed by a module, a programming module, or other elements may be executed in a sequential, parallel, or heuristic method. Also, a portion of the operations may be executed in a different sequence, omitted, or other operations may be added.

Figure 4:
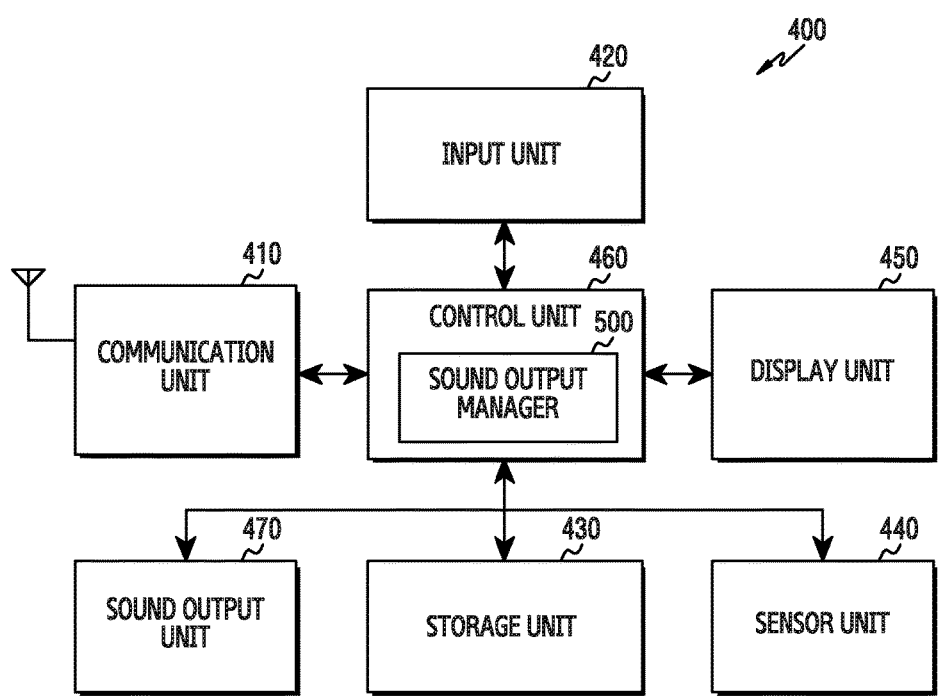
FIG. 4 is a block diagram illustrating an electronic device according to various embodiments of the present disclosure.

FIG. 4 is a block diagram illustrating an electronic device according to various embodiments of the present disclosure.

Referring to FIG. 4, an electronic device 400 according to the various embodiments of the present disclosure (e.g., the electronic device 101) may include a communication unit 410, an input unit 420, a storage unit 430, a sensor unit 440, a display unit 450, a control unit 460, and a sound output unit 470.

The communication unit 410 may perform communications in the electronic device 400. According to the various embodiments of the present disclosure, the communication unit 410 may be at least one of the communication interface 170 and the communication module 220. In this case, the communication unit 410 may communicate with an external electronic device (e.g., the electronic device 102 or 104 or the server 106) in various communication manners. According to the various embodiments of the present disclosure, the communication unit 410 may perform at least any one of wireless communications and wired communications. According to one embodiment of the present disclosure, the communication unit 410 may have access to at least any one of a mobile communication network and a data communication network. According to another embodiment of the present disclosure, the communication unit 410 may perform short-distance communications. For example, the external electronic device may include an electronic device, a base station, a server, and a satellite. In addition, the communication scheme may include LTE, WDCMA, GSM, Wi-Fi, Bluetooth, and NFC. The electronic device 400 may use the communication unit 410 to receive, from at least one external electronic device connected using a short-distance wireless communication scheme, at least one piece of sensor information measured through at least one sensor of the external electronic device.

The input unit 420 may generate input data in the electronic device 400. According to the various embodiments of the present disclosure, the input unit 420 may be at least one of the input/output interface 150 and the input device 250. In this case, the input unit 420 may generate input data in response to a user input of the electronic device 400. According to the various embodiments of the present disclosure, the input unit 420 may include at least one input means. For example, the input unit 420 may include a key pad, a dome switch, a physical button, a touch panel, a jog & shuttle, and a sensor. According to the various embodiments of the present disclosure, the input unit 420 may generate input data for requesting an outgoing call, input data for accepting an incoming call, and input data for rejecting the incoming call.

The storage unit 430 may store operating programs of the electronic device 400. According to the various embodiments of the present disclosure, the storage unit 430 may be at least one of the memory 130 and the memory 230. In this case, the storage unit 430 may store a program (or an application) for executing various functions. In addition, the storage unit 430 may store data generated while performing each of the functions. According to the various embodiments of the present disclosure, the data stored in the storage unit 430 may be related to information for determining a sound output situation. According to one embodiment of the present disclosure, the sound output situation may be a calling situation. In this case, the sound output situation may be related to a device used in a call. For example, it may be a situation of making a call to the electronic device 400 and/or a situation of making a call to the external electronic device. According to another embodiment of the present disclosure, the sound output situation may be related to whether the external electronic device connected to the electronic device 400 is worn.

The sensor unit 440 may collect information for determining the sound output situation. According to the various embodiments of the present disclosure, the sensor unit 440 may be the sensor module 240. According to one embodiment of the present disclosure, the sensor unit 440 may include at least one of an image sensor, a microphone, a plurality of sensors (e.g., a grip sensor, a geomagnetic sensor, an acceleration sensor, a digital compass, a tilt sensor, an optical sensor, a proximity sensor, a touch sensor, or the like) capable of determining a state of the electronic device 400, a module capable of acquiring location information, and a module for detecting a wired or wireless signal.

The display unit 450 may output display data. According to the various embodiments of the present disclosure, the display unit 450 may be at least one of the display 160 and the display 260. In this case, the display unit 450 may display an execution screen corresponding to at least one of a plurality of functions of the electronic device 400. The display unit 450 may include a LCD, a LED display, an OLED display, a MEMS display, and an electronic paper display. Herein, the display unit 450 may be implemented in a touch screen by being coupled with the input unit 420. In this case, the display unit 450 may detect an input for requesting an outgoing call, an input for accepting an incoming call, an input for rejecting the incoming call, or the like.

The control unit 460 may control an overall operation of the electronic device 400. According to the various embodiments of the present disclosure, the control unit 460 may be at least one of the processor 120 and the application processor 210. For example, when a sound output event (e.g., a call event) occurs in a state of being connected to the external electronic device, the control unit 460 may provide a process to establish a sound output path (e.g., a call path) to the external electronic device. According to the various embodiments of the present disclosure, when the sound output event occurs through the electronic device 400 in the state of being connected to the external electronic device, the control unit 460 may provide a process to establish the sound output path to the electronic device on the basis of a function of the external electronic device satisfying a condition. In this case, the control unit 460 may determine the function of the external electronic device satisfying the condition according to whether a loudspeaker function is provided. For example, if a call is attempted by using the electronic device 400 in a state of being connected to the external electronic device providing the loudspeaker function, the control unit 460 may provide a process to establish the sound output path to the electronic device 400 even if it is connected to the external electronic device.

In addition, if the sound output event occurs through the electronic device 400 in the state of being connected to the external electronic device, the control unit 460 may provide a process to establish a sound path to the electronic device 400 on the basis of at least one of states of the electronic device 400 satisfying a condition. In this case, the control unit 460 may confirm at least one of a state of the electronic device 400 approaching a user's body (e.g., a face), a state of the electronic device 400 gripped by the user, and a state of the electronic device 400 generating a gesture for attempting a call.

According to the various embodiments of the present disclosure, the control unit 460 may include a sound output manager 500, and may control the sound output manager 500 to perform the aforementioned operation.

According to another embodiment of the present disclosure, the control unit 460 may imply a processor for executing one or more software programs stored in a memory device (e.g., the storage unit 430 or memory 130). That is, the aforementioned operation of the control unit 460 may be executed by the software program executed by the processor.

The sound output unit 470 may provide an audio interface between the user and the electronic device 400. According to the various embodiments of the present disclosure, the sound output unit 470 may output a sound generated by the sound output event in response to the establishment of the sound output path to the electronic device 400. For example, the sound output unit 470 may output the sound through a speaker of the electronic device 400 and an earphone or the like connected to the electronic device 400. In addition, although not shown, the electronic device 400 may include a microphone operating in response to the establishment of the sound output path to the electronic device 400.

Figure 5:
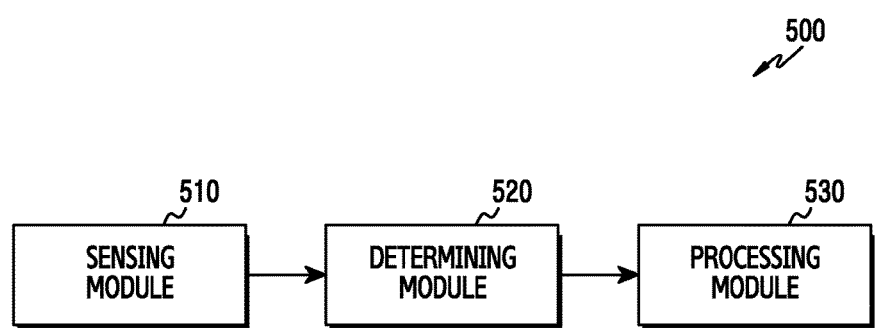
FIG. 5 illustrates a structure of a sound output manager in an electronic device according to various embodiments of the present disclosure.

FIG. 5 illustrates a structure of a sound output manager according to various embodiments in the electronic device 400 of the present disclosure. According to the various embodiments of the present disclosure, the sound output manager 500 may be included in the control unit 460 of the electronic device 400.

According to the various embodiments of the present disclosure, the sound output manager 500 may include a sensing module 510, a determining module 520, and a processing module 530.

Referring to FIG. 5, the sensing module 510 may detect a sound output event. Herein, the sound output event may be a call event, and may include, for example, at least one of an input for requesting an outgoing call and an input for accepting an incoming call.

According to one embodiment of the present disclosure, the sound output event may be defined as a touch-type input, and in this case, the sensing module 510 may be operatively connected to a sensor (e.g., a touch screen) capable of detecting an input using a part of a user's body or an electronic pen. In this case, the sensing module 510 may detect a direct input (e.g., a direct touch) or an indirect input (e.g., a proximity touch) regarding the part of the user's body or the electronic pen.

According to another embodiment of the present disclosure, the sound output event may be related to at least one of a voice input, a gesture input, and a button input in addition to the touch input. For example, the sensing module 510 may be operatively connected to a microphone for detecting a voice-type call event. For another example, the sensing module 510 may be connected to an operation detection sensor for detecting a gesture-type call event. For another example, the sensing module 510 may detect the call event by being connected to a button (e.g., a power button, a volume button, or the like) for generating a specific command.

The determining module 520 may determine an electronic device to be used in a sound output, e.g., an electronic device to be used in a call, in response to the detection of the sound output event. According to one embodiment of the present disclosure, the determining module 520 may determine that a user will use the electronic device 400 in the call on the basis of at least one of a function of an external electronic device satisfying a condition and a state of the electronic device 400 satisfying a condition.

For example, the function of the external electronic device satisfying the condition may be a loudspeaker function, and the determining module 520 may determine that it is a situation in which the user uses the electronic device 400 when the call button of the electronic device 400 is input in a state of being connected to the external electronic device having an external speaker. For another example, the state of the electronic device satisfying the condition may be related to at least one of a state of being gripped by the user, a state of moving to the user's body, and a state of generating a gesture for attempting a call, and the determining module 520 may determine that it is a situation in which the user uses the electronic device 400 upon detecting the state of the electronic device 400 satisfying the condition after the call button of the electronic device 400 is input.

The processing module 530 may establish a sound output path on the basis of the electronic device to be used in the sound output determined by the determining module 520. According to one embodiment of the present disclosure, the processing module 530 may provide a process not to establish a voice channel with respect to the connected external electronic device upon confirming that the electronic device 400 is used in the call. For example, the processing module 530 may provide a process so that an asynchronous connectionless (ACL) link established for data communications is maintained, without having to request to establish a synchronization connection oriented (SCO) link for voice communications with the external electronic device.

According to another embodiment of the present disclosure, the processing module 530 may provide a process so that the voice channel is established with respect to the connected external electronic device upon confirming that the external electronic device is used in the sound output. For example, the processing module 530 may request the external electronic device to establish the SCO link. In addition, the processing module 530 may provide a process so that the voice channel is not established with respect to the connected external electronic device upon confirming that the external electronic device is used in the call but the external electronic device is not worn on the user's body.

According to various embodiments of the present disclosure, an electronic device may include a communication unit for establishing a communication link with respect to at least one external electronic device, a sensor module configured to detect at least one piece of sensor data, and a controller for selecting at least one device for outputting a sound from at least one of: the electronic device, and the at least one external electronic device, the selection made on the basis of at least one of: the at least one piece of sensor data detected through the sensor module, and situation information of the at least one external electronic device, in a state of being connected to the at least one external electronic device.

According to the various embodiments of the present disclosure, the electronic device may further include a speaker for outputting a sound. The controller may select the device for outputting the sound from the speaker and/or the at least one external electronic device on the basis of at least one of the at least one piece of sensor data detected through the sensor module, and the situation information of the at least one external electronic device.

According to the various embodiments of the present disclosure, the communication unit may include at least one of a cellular module and a non-cellular module, and may be connected to the at least one external electronic device by using at least one of the non-cellular modules through a short-distance wireless communication scheme.

According to the various embodiments of the present disclosure, the sensor module may include at least one of a gesture sensor, a gyro sensor, an acceleration sensor, a proximity sensor, a bio sensor, an illumination sensor, a magnetic sensor, a grip sensor, and a RGB sensor.

According to the various embodiments of the present disclosure, the communication unit may receive the situation information of the at least one external electronic device from the at least one external electronic device connected to the electronic device.

According to the various embodiments of the present disclosure, the controller may skip an attempt to establish a link for voice communications with the at least one external electronic device in response to the selection of the electronic device as the device for outputting the sound.

According to the various embodiments of the present disclosure, the controller may attempt to establish a link for voice communications with the at least one external electronic device in response to the selection of the at least one external electronic device as the device for outputting the sound.

According to the various embodiments of the present disclosure, the controller may select the electronic device as the device for outputting the sound in response to the detection of the sensor data related to a calling situation using the electronic device.

According to the various embodiments of the present disclosure, the calling situation using the electronic device may relate to at least one of a situation in which the electronic device is gripped by a user, a situation in which the electronic device moves to a user's body, and a situation in which a gesture is made to attempt to make a call.

According to the various embodiments of the present disclosure, the at least one external electronic device may be a wearable device. The controller may select the electronic device as the device for outputting the sound in response to a collection of information related to a situation in which a user does not wear the at least one external electronic device.

According to the various embodiments of the present disclosure, the controller may select the at least one device for outputting the sound on the basis of Bluetooth Class of Device (COD) information among situation information collected from the at least one external electronic device.

According to the various embodiments of the present disclosure, the electronic device may further include a display unit. According to the various embodiments of the present disclosure, the controller may convert a received voice signal in a text format before selecting the device for outputting the sound, and displays the signal to the display unit.

Figure 6:
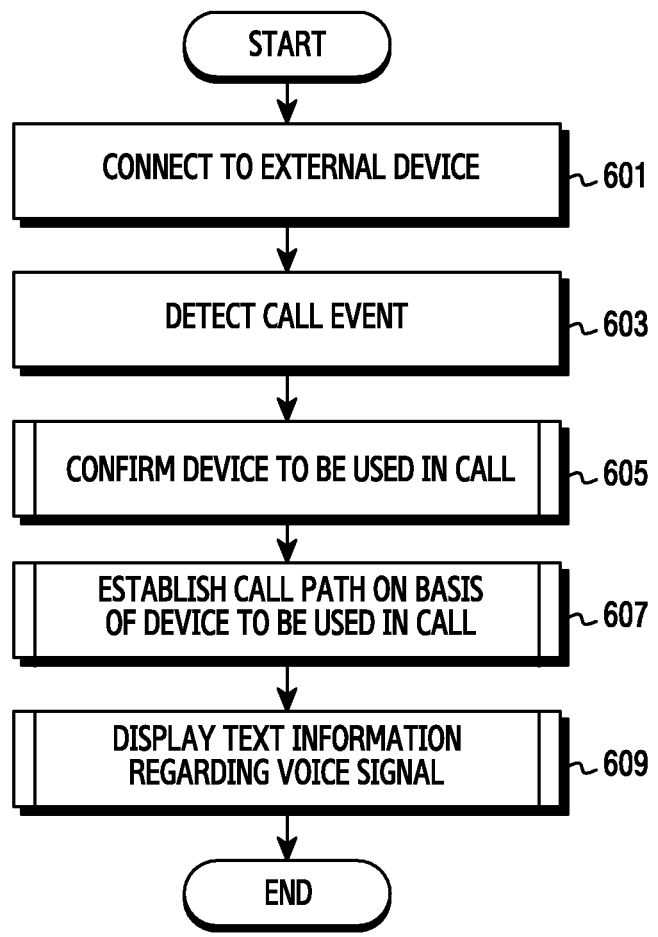
FIG. 6 is a flowchart illustrating a procedure of controlling a sound output of an electronic device according to various embodiments of the present disclosure.

FIG. 6 is a flowchart illustrating a procedure of controlling a sound output of the electronic device 400 according to various embodiments of the present disclosure. According to the various embodiments of the present disclosure, an operation of the electronic device 400 may be an operation of at least one of the electronic device 101, the electronic device 200, the processor 120, the application processor 210, and the sound output manager 500.

In operation 601, the electronic device 400 may connect to an external electronic device. According to one embodiment of the present disclosure, the electronic device 400 may use a short-distance wireless communication scheme, for example, a Bluetooth communication scheme, to connect to the external electronic device. The external electronic device may be a wireless headset, car-kit, smart watch, or the like, for providing a hands-free function. The electronic device 400 may search for a neighboring communicable external electronic device and may connect to the at least one found external electronic device in a communicable manner. In this case, an ACL link for data communications may be established between the electronic device 400 and the external electronic device.

In operation 603, the electronic device 400 may detect a call event, for example, an input for requesting an outgoing call, an input for accepting an incoming call, or the like. According to one embodiment of the present disclosure, the electronic device 400 may detect an outgoing call input and/or an incoming call input on the basis of at least one of a voice input, a gesture input, a touch input, and a button input. In addition, the call event may be generated by the electronic device 400 or the external electronic device connected to the electronic device 400.

According to the various embodiments of the present disclosure, the electronic device 400 may display information on the external electronic device connected to the electronic device 400 on a screen in response to the generation of the call event.

Figure 14:
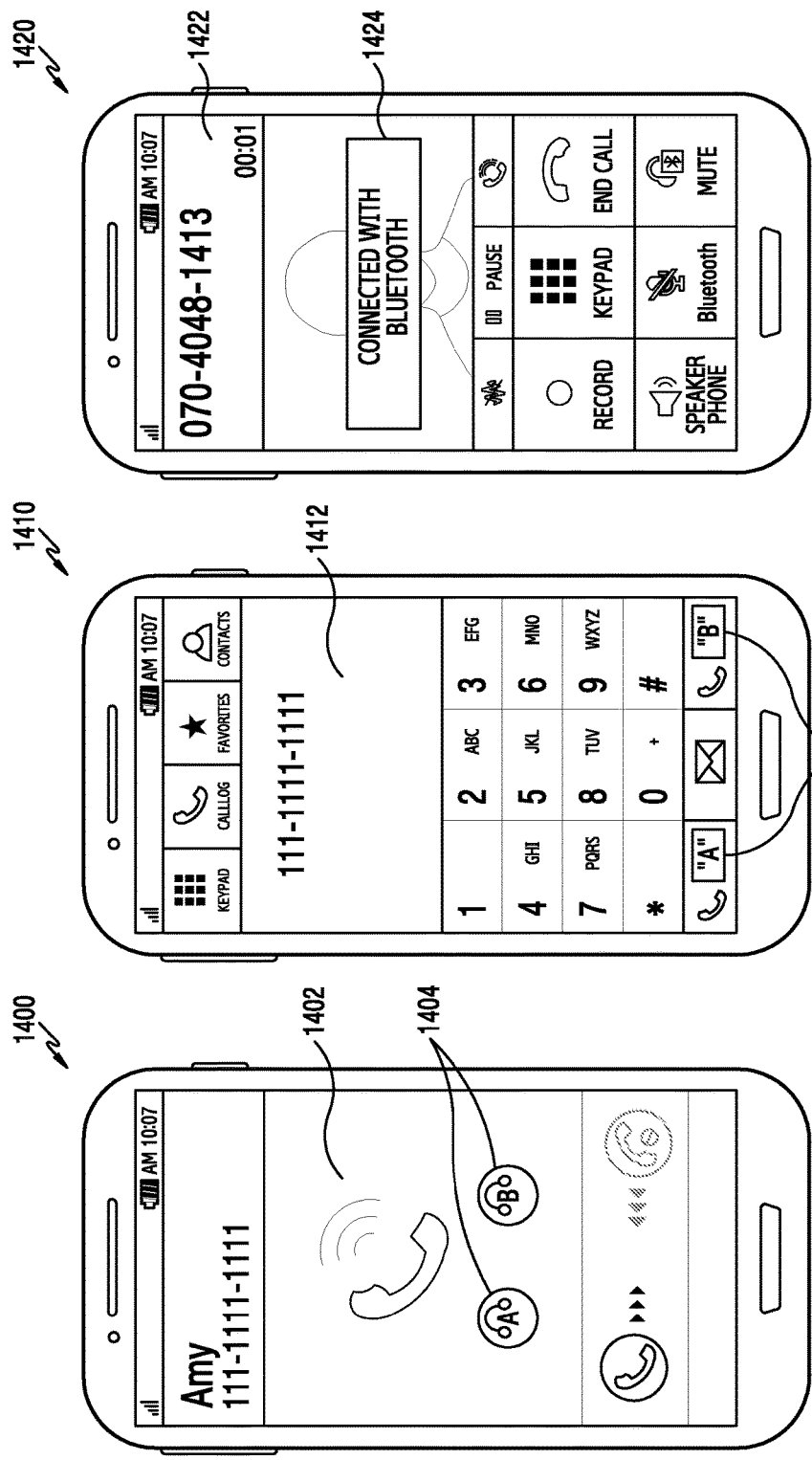
FIG. 14A illustrates an example for explaining a situation of detecting a call event according to various embodiments of the present disclosure.
FIG. 14B illustrates an example for explaining a situation of detecting a call event according to various embodiments of the present disclosure.
FIG. 14C illustrates an example for explaining a situation of detecting a call event according to various embodiments of the present disclosure.

For example, as indicated by 1400 of FIG. 14A, if a call is received in a state of being connected to a plurality of external electronic devices (e.g., a headset A and a headset B), the electronic device 400 may display an icon 1404 of a currently connected external electronic device on a screen portion 1402. In addition, the electronic device 400 may detect an input for selecting the icon, and may use an external electronic device corresponding to the selected icon as a call path. For example, a user may use the headset A to make a call to a calling party by dragging the icon of the headset A displayed on the screen when receiving the call.

For another example, as indicated in 1410 of FIG. 14B, if an outgoing call is achieved in a state of being connected to the plurality of external electronic devices (e.g., the headset A and the headset B) (see 1412), the electronic device 400 may display an icon 1414 of a currently connected external electronic device on a screen portion. For example, as illustrated, the electronic device 400 may generate a call button corresponding to the number of the connected external electronic devices, and may dispose the icon of the connected external electronic device to each call button. In addition, the electronic device 400 may detect an input for selecting the call button, and may use the external electronic device corresponding to the selected call button as a call path. For example, if the call button to which the icon of the headset A is disposed is input in a state where an incoming call number is designated, the user may make a call to a called party by using the headset A.

For another example, as indicated by 1420 of FIG. 14C, if an incoming call is accepted in a state of being connected to the external electronic device (see 1422), the electronic device 400 may display information 1424 on the screen portion to indicate that it is connected to a currently connected external electronic device.

In operation 605, the electronic device 400 may confirm a device to be used in the call on the basis of situation information. According to one embodiment of the present disclosure, the electronic device 400 may confirm whether the user will perform the call with the electronic device 400 or to the connected electronic device. In this case, the electronic device 400 may determine a situation on the basis of attribute information of the external electronic device, sensing information collected by the electronic device 400, and sensing information collected by the external electronic device, and may confirm the device to be used in the call on the basis thereof. Further, the electronic device 400 may confirm the device to be used in the call by detecting an input for the information of the connected external electronic device displayed on the screen. A procedure of confirming the device to be used in the call on the basis of the situation information will be described below with reference to FIG. 7, FIG. 8, and FIG. 9. In addition, upon acquiring information related to a plurality of situations simultaneously, the electronic device 400 may select situation information to be used when selecting the device to be used in the call on the basis of a pre-defined condition (e.g., a priority, a frequency of use, or the like).

In operation 607, the electronic device 400 may establish a call path to output a sound to the confirmed device on the basis of the situation information. The electronic device 400 may establish the call path by using the procedure performed with reference to FIG. 10 according to various embodiments of the present disclosure.

In operation 609, the electronic device 400 may display text information regarding a voice signal on the screen. According to one embodiment of the present disclosure, the electronic device 400 may provide a voice signal received from another electronic device as the text information until the call path is established on the basis of the procedure performed with reference to FIG. 13. The operation 609 may be omitted in the sound output control procedure of the electronic device 400.

Figure 7:
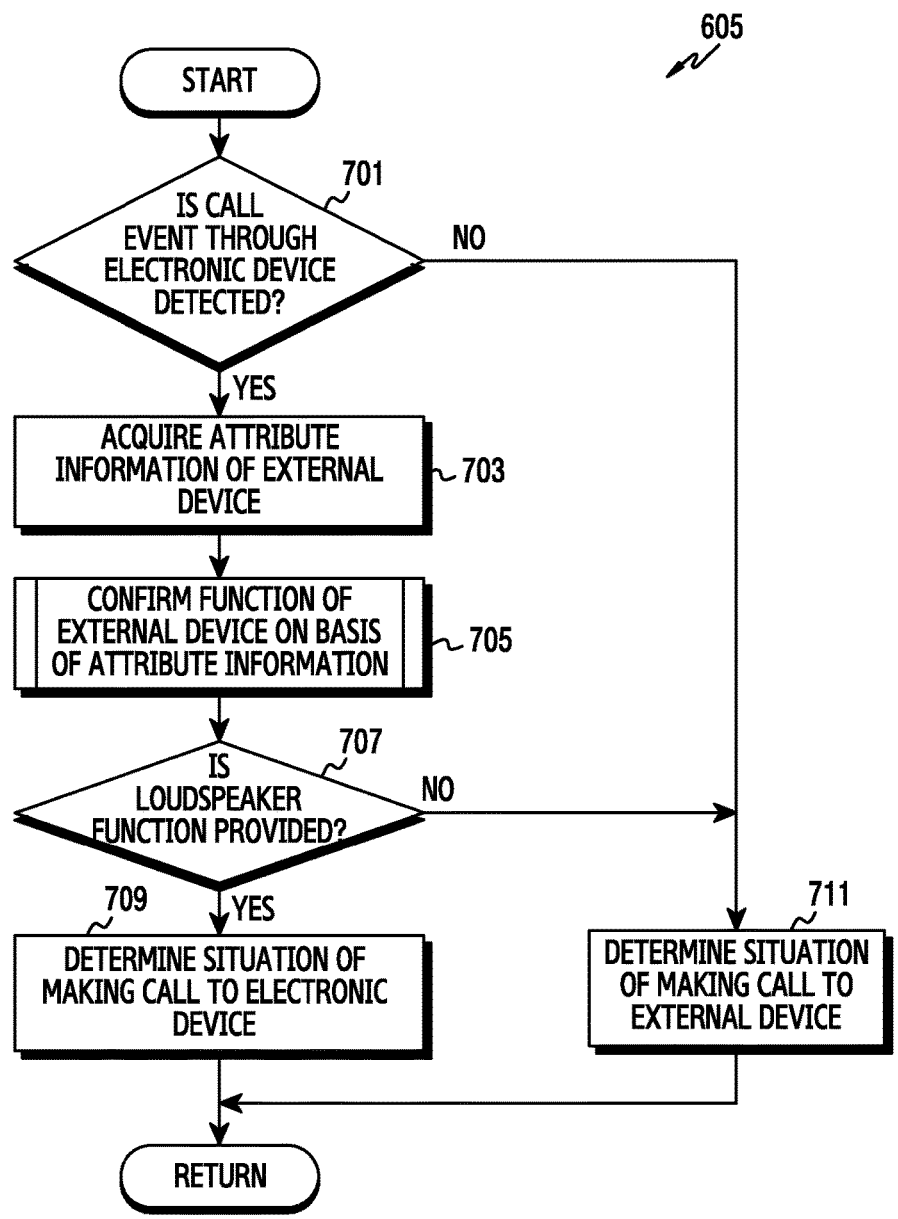
FIG. 7 is a flowchart illustrating a procedure of performing an operation of confirming a device to be used in an electronic device according to an embodiment of the present disclosure.

FIG. 7 is a flowchart illustrating a procedure of performing an operation of confirming a device to be used in the electronic device 400 according to an embodiment of the present disclosure. According to various embodiments of the present disclosure, the operation of confirming the device to be used may be a detailed operation of the operation 605 of FIG. 6.

Referring to FIG. 7, in operation 701, the electronic device 400 may confirm whether a call event generated through the electronic device 400 is detected. In other words, it may be confirmed whether an input for attempting an incoming call or an outgoing call through the electronic device 400 is detected. For example, the electronic device 400 may confirm whether at least one of a touch input on a screen of the electronic device 400, a button input provided in the electronic device 400, and a gesture input using the electronic device 400 is detected.

In operation 703, upon detecting the call event generated through the electronic device 400, the electronic device 400 may acquire attribute information of a connected external electronic device. According to one embodiment of the present disclosure, the attribute information of the external electronic device is information related to capability. For example, the electronic device 400 may acquire a Bluetooth COD of the connected external electronic device as the attribute information.

In operation 705, the electronic device 400 may confirm a function of the external electronic device on the basis of the acquired attribute information. According to one embodiment of the present disclosure, the electronic device 400 may confirm the function of the external electronic device related to an audio output. For example, in operation 707, the electronic device 400 may confirm whether the connected external electronic device provides a loudspeaker function.

Figure 17:
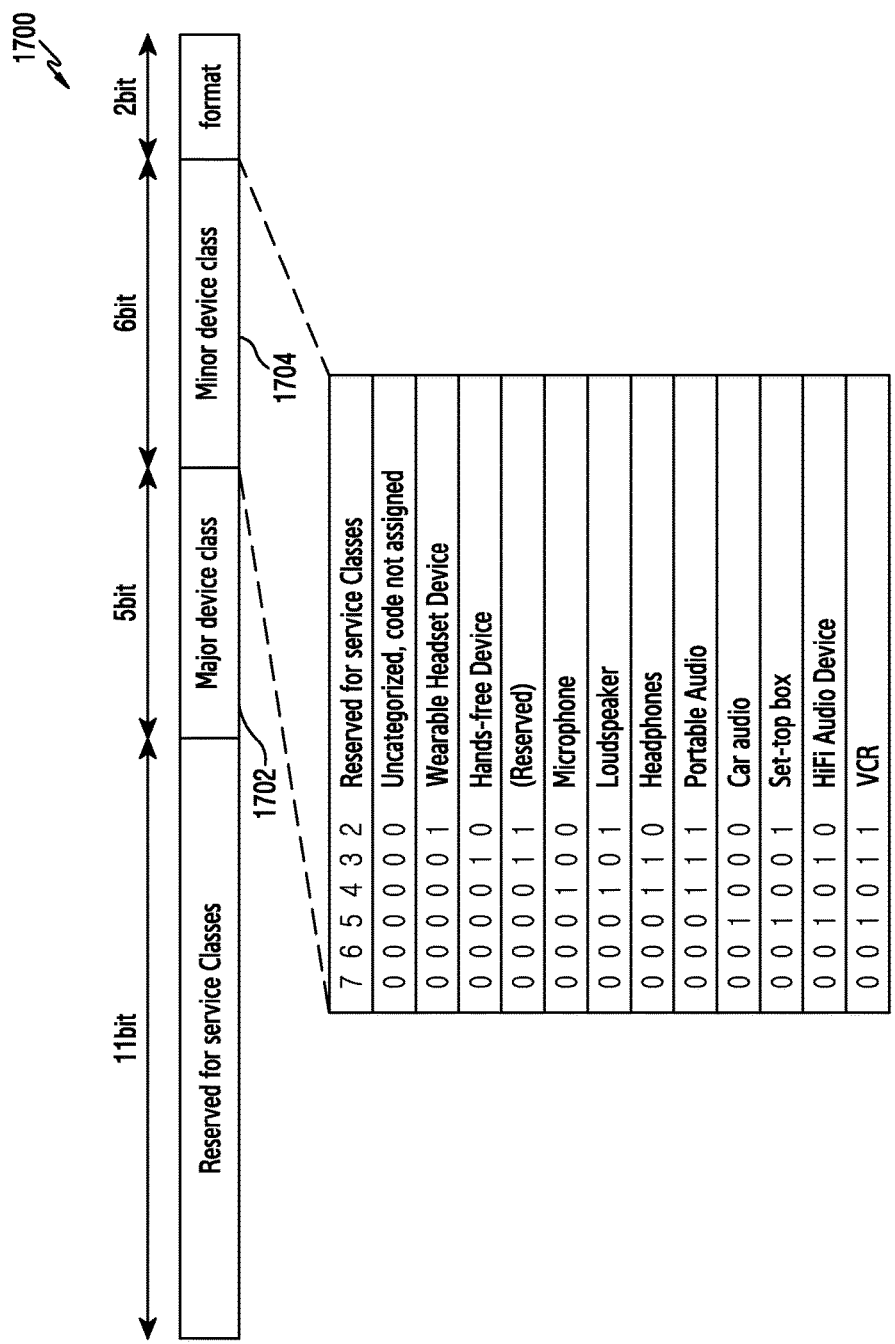
FIG. 17 illustrates an example for explaining a situation of recognizing a function of an external electronic device according to various embodiments of the present.

In order to confirm the function of the external electronic device according to various embodiments of the present disclosure, the electronic device 400 may perform the following procedure. According to one embodiment of the present disclosure, the electronic device 400 may request the Bluetooth COD of the external electronic device through an ACL link established with respect to the connected external electronic device, and may analyze received COD information. In addition, the electronic device 400 may confirm a type of the external electronic device on the basis of the analyzed COD information, and may confirm whether the external electronic device has an external speaker. According to one embodiment of the present disclosure, referring to FIG. 17, the electronic device 400 may analyze at least one of a major device class field 1702 and a minor device class field 1704 of the COD information. In this case, the electronic device 400 may analyze the major device class field 1702 to confirm a connected device type (e.g., a network device, a rendering device, a capturing device, a transmitting device, an audio device, a calling device, or the like), and may analyze the minor device class field 1704 to confirm a specific device of each major device. For example, the electronic device 400 may analyze the minor device class field 1704 to confirm whether the audio device is a handsfree device, a loudspeaker, a head phone, or a car audio. Accordingly, the electronic device 400 may determine that a loudspeaker function is provided to an external electronic device having an external speaker. Further, the electronic device 400 may determine that the loudspeaker function is not provided to an external device not having the external speaker.

The use of the COD information as described above is one embodiment of the present disclosure. According to the various embodiments of the present disclosure, the electronic device 400 may analyze a name of the connected external electronic device to determine whether the loudspeaker function is provided.

Figure 15:
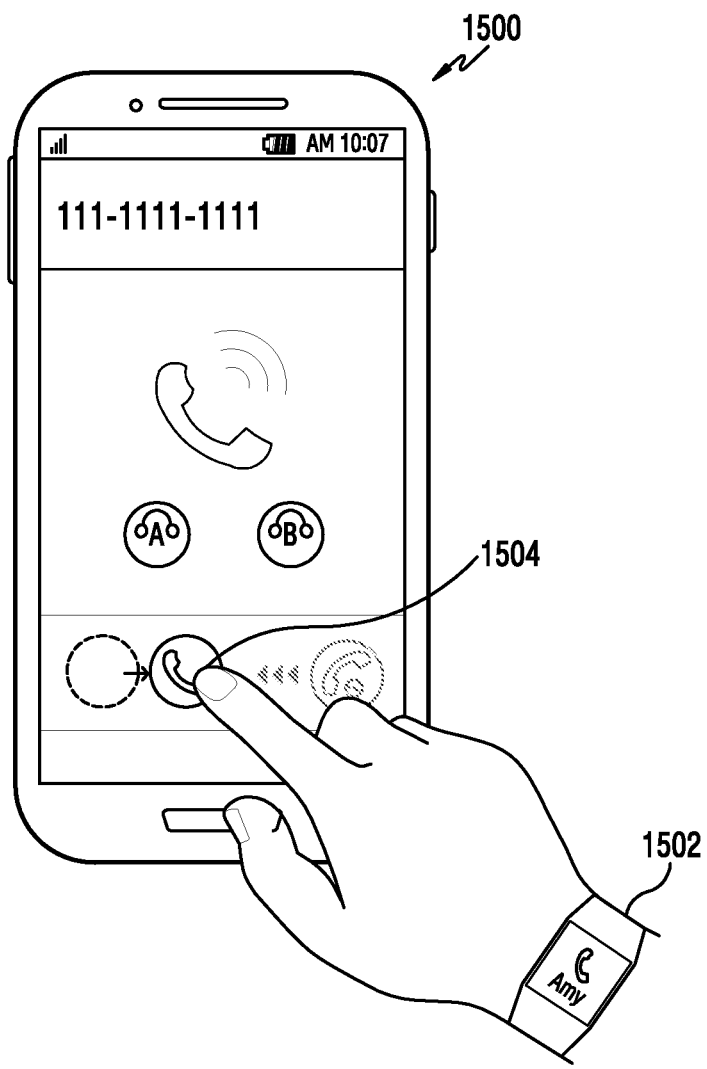
FIG. 15 illustrates an example for explaining a situation of determining that it is desired to make a call to an electronic device on the basis of a function of an external electronic device according to various embodiments of the present disclosure.

In operation 709, the electronic device 400 may determine that it is a situation of making a call to the electronic device in response to the providing of the loudspeaker function by the external electronic device. According to one embodiment of the present disclosure, as shown in FIG. 15, upon detecting a user input 1504 for accepting an incoming call in a state of wearing an external electronic device (e.g., a smart watch) 1502 having an external speaker, the electronic device 400 may determine that a user wants to make a call to the electronic device 400 (see 1500).

In addition, if it is determined in operation 701 that the call event through the electronic device is not generated or if it is determined in operation 707 that the connected external electronic device does not provide the loudspeaker function, the electronic device 400 according to the various embodiments of the present disclosure may determine that it is the situation of making the call to the external electronic device in operation 711.

The electronic device 400 according to the various embodiments of the present disclosure may determine a situation of making the call to the electronic device 400 in operation 709, and thereafter may return to the procedure of FIG. 6. Alternatively, the electronic device 400 may determine the situation of making the call to the external electronic device in operation 711, and thereafter may return to the procedure of FIG. 6

Figure 8:
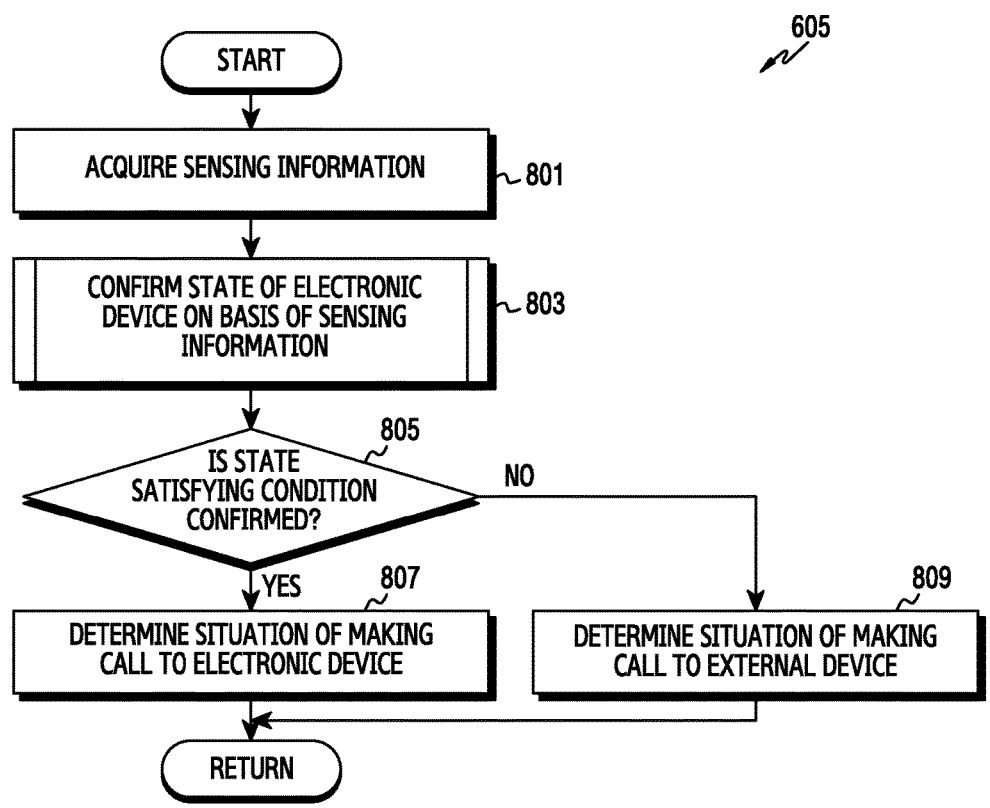
FIG. 8 is a flowchart illustrating a procedure of performing another operation of confirming a device to be used in a call in an electronic device according to an embodiment of the present disclosure.

FIG. 8 is a flowchart illustrating a procedure of performing another operation of confirming a device to be used in a call in the electronic device 400 according to an embodiment of the present disclosure. According to various embodiments of the present disclosure, the operation of confirming the device to be used may be another operation of the operation 605 of FIG. 6.

Referring to FIG. 8, in operation 801, the electronic device 400 may acquire sensing information. According to one embodiment of the present disclosure, the electronic device 400 may acquire sensing information related to at least one of a proximity sensor, a gyro sensor, a touch sensor, and a grip sensor.

In operation 803, the electronic device 400 may confirm a state of the electronic device 400 on the basis of the sensing information. According to one embodiment of the present disclosure, the electronic device 400 may confirm the state of the electronic device 400 satisfying at least one of condition of a state of the electronic device 400 approaching a user's body (e.g., a face), a state of the electronic device 400 gripped by the user, and a state of the electronic device 400 generating a gesture for attempting a call.

In operation 805, the electronic device 400 may confirm whether the state of the electronic device 400 satisfying the condition is confirmed.

Figure 16:
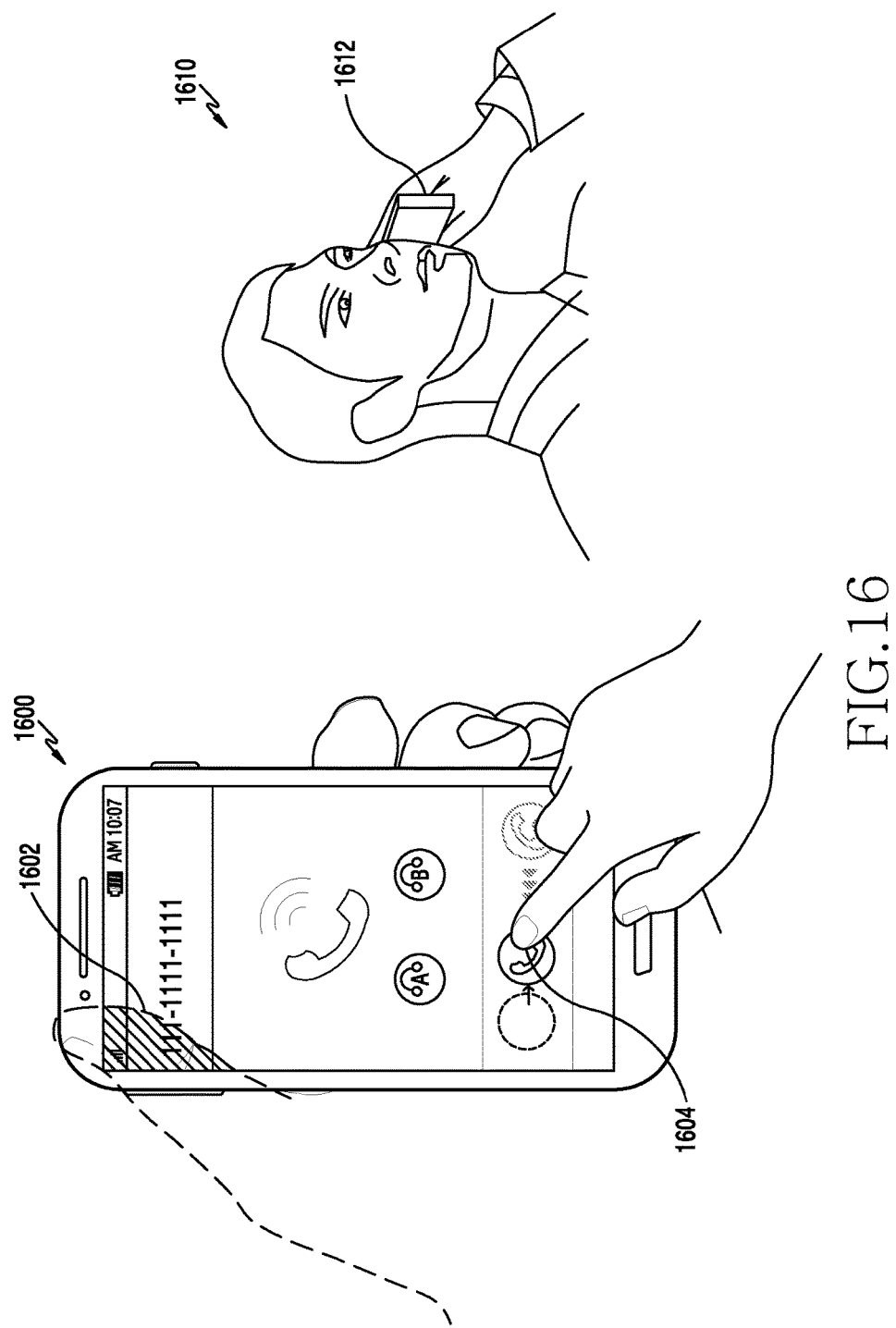
FIG. 16 illustrates an example for explaining a situation of determining that it is desired to make a call to an electronic device on the basis of sensing information according to various embodiments of the present disclosure.

If it is confirmed in operation 805 that it is a state of satisfying the condition, the electronic device 400 may determine the situation of making the call to the electronic device 400 in operation 807. According to one embodiment of the present disclosure, as shown in FIG. 16, upon detecting a user input 1604 for accepting an incoming call in a state 1602 of gripping a portion of a touch screen, the electronic device 400 may determine that a user wants to make a call to the electronic device 400 (see 1600). According to another embodiment of the present disclosure, upon confirming an approach to a user's body (see 1612) after accepting the incoming call, it may be determined that the user wants to make the call to the electronic device 400 (see 1610).

If it is confirmed in operation 805 that it is a state of not satisfying the condition, the electronic device 400 may determine a situation of making a call to the external electronic device in operation 809.

The electronic device 400 according to the various embodiments of the present disclosure may determine the situation of making the call to the electronic device 400 in operation 807, and thereafter may return to the procedure of FIG. 6. Alternatively, the electronic device 400 may determine the situation of making the call to the external electronic device in operation 809, and thereafter may return to the procedure of FIG. 6.

Figure 9:
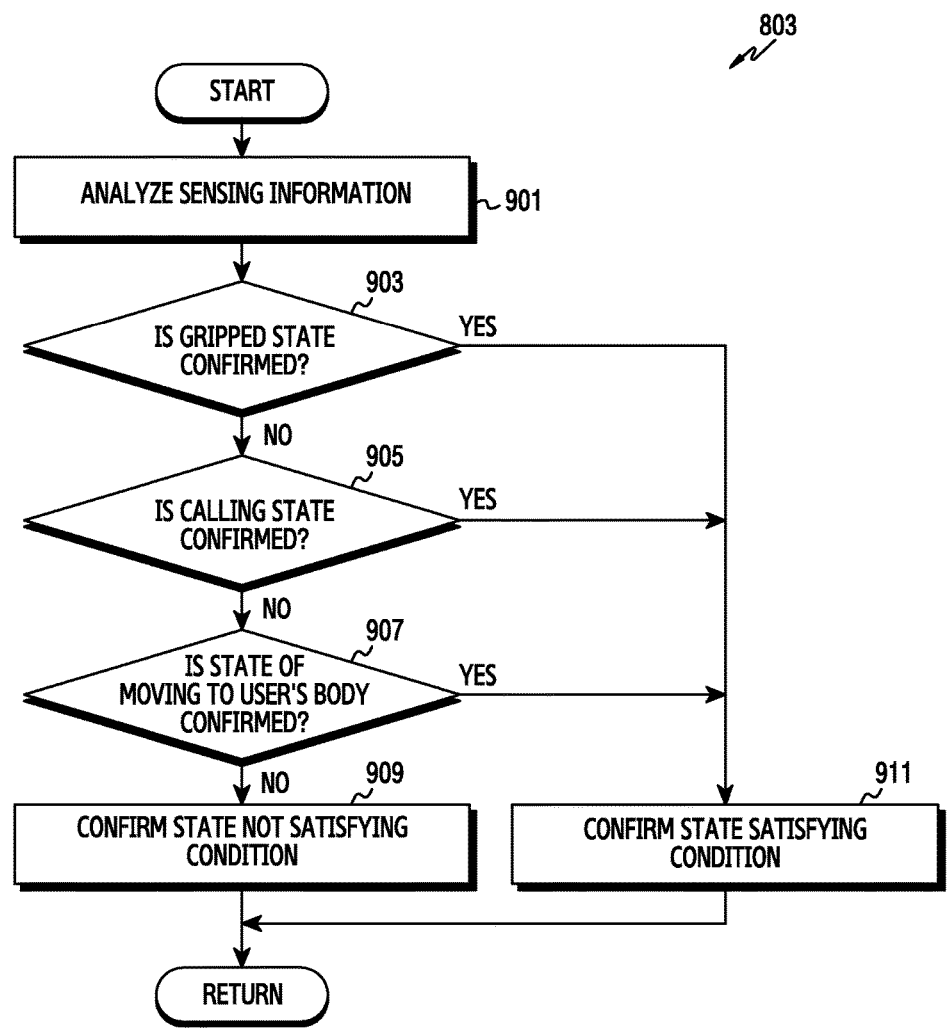
FIG. 9 is a flowchart illustrating a procedure of performing an operation of confirming a state of an electronic device on the basis of sensing information in an electronic device according to an embodiment of the present disclosure.

FIG. 9 is a flowchart illustrating a procedure of performing an operation of confirming a state of the electronic device 400 on the basis of sensing information in the electronic device 400 according to an embodiment of the present disclosure. According to various embodiments of the present disclosure, the operation of confirming the state of the electronic device 400 may be a detailed operation of the operation 803 of FIG. 8.

Referring to FIG. 9, the electronic device 400 may analyze sensing information in operation 901, and may confirm whether it is a state of being gripped by a user in operation 903. According to one embodiment of the present disclosure, the electronic device 400 may determine that it is a state where the electronic device 400 is gripped by the user in response to an acquisition of sensing information corresponding to an area greater than or equal to a pre-defined threshold. In this case, the electronic device 400 may confirm the gripped state on the basis of at least one of a grip sensor and a touch sensor.

If a state of not being gripped is confirmed in operation 903, the electronic device 400 may confirm whether it is a calling state in operation 905. Herein, the calling state may be related to a user's gesture. According to one embodiment of the present disclosure, the electronic device 400 may confirm that the electronic device 400 is in a state of being moved by the calling state in response to an acquisition of sensing information corresponding to a pre-defined motion (e.g., a rotation, or the like). In this case, the electronic device 400 may confirm the calling state on the basis of a gyro sensor.

If the calling state is not confirmed in operation 905, the electronic device 400 may confirm whether the electronic device 400 is in a state of moving to a user's body in operation 907. Herein, the state of moving to the user's body may be related to a state of being in proximity to the user's body (e.g., the face). According to one embodiment of the present disclosure, upon acquiring sensing information corresponding to a proximity of a pre-defined distance, the electronic device 400 may determine that it is the state of moving to the user's body. In this case, the electronic device 400 may confirm a state of moving on the basis of the proximity sensor.

If a state of not moving to the user's body is confirmed in operation 907, the electronic device 400 may confirm that it is a state not satisfying the condition in operation 909.

Further, it may be confirmed that the electronic device 400 satisfies the condition in operation 911, if the gripped state is confirmed in operation 903, the calling state is confirmed in operation 905, and the state of moving to the user's body is confirmed in operation 907.

The electronic device 400 according to the various embodiments of the present disclosure may confirm the state of not satisfying the condition in operation 909, and thereafter may return to the procedure of FIG. 8. Alternatively, the electronic device 400 may confirm the state of satisfying the condition operation 911, and thereafter may return to the procedure of FIG. 8.

Figure 10:
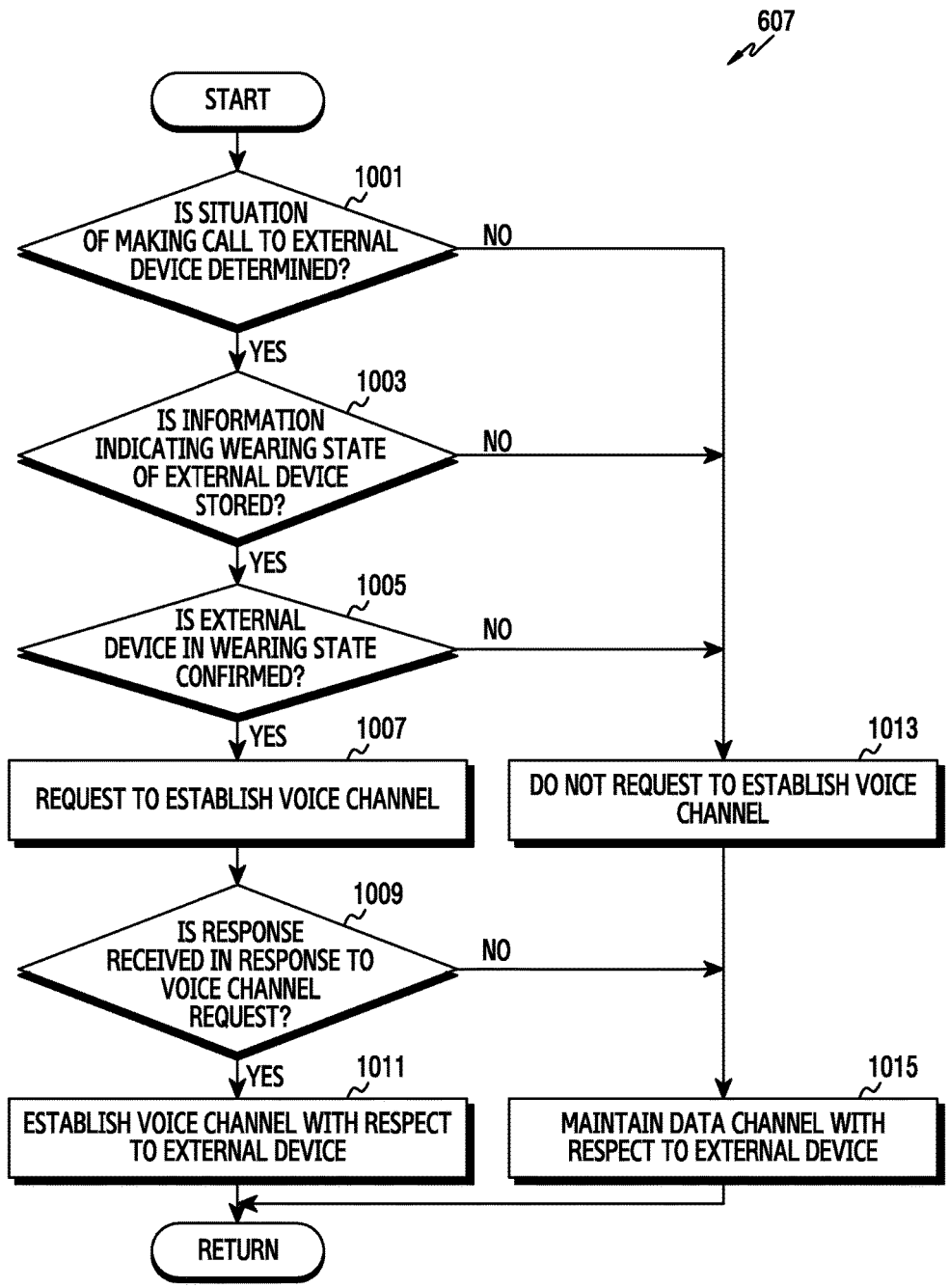
FIG. 10 is a flowchart illustrating a procedure of performing an operation of establishing a call path in an electronic device according to an embodiment of the present disclosure.

FIG. 10 is a flowchart illustrating a procedure of performing an operation of establishing a call path in the electronic device 400 according to an embodiment of the present disclosure. According to the various embodiments of the present disclosure, the operation of establishing the call path may be a detailed operation of the operation 607 of FIG. 6.

Referring to FIG. 10, in operation 1001, the electronic device 400 may confirm whether a situation of making a call to an external electronic device is determined.

Figure 11:
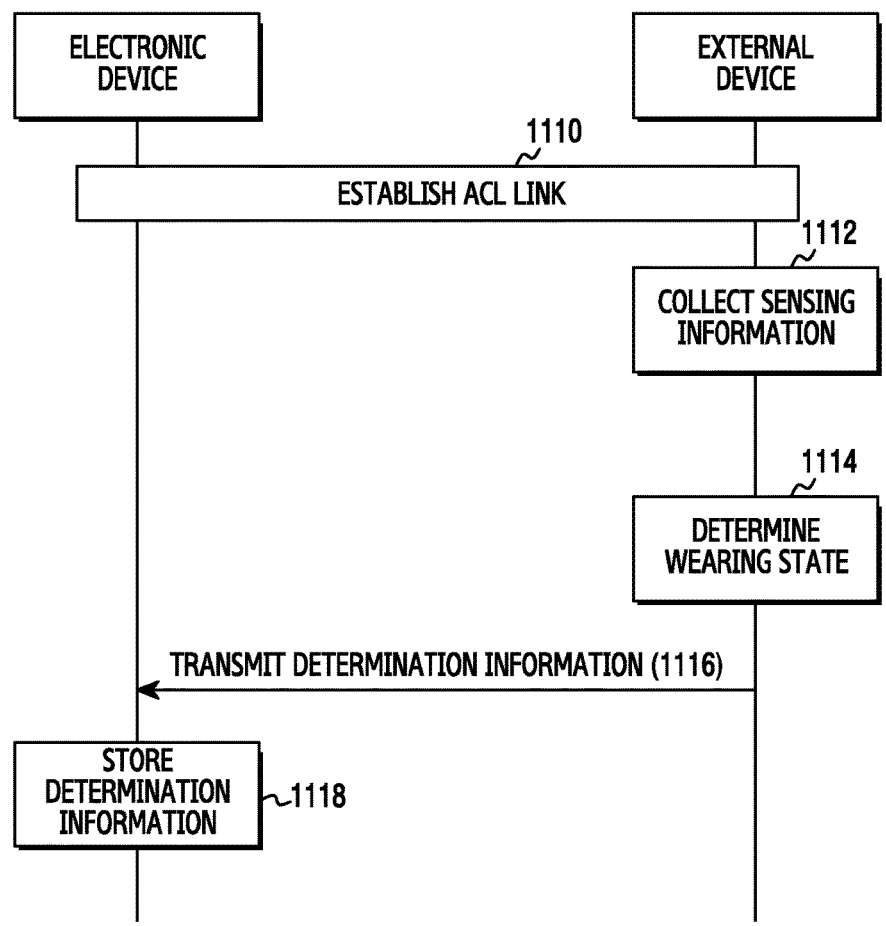
FIG. 11 illustrates a procedure of performing an operation of storing determination information related to a wearing state of an external electronic device in an electronic device according to an embodiment of the present disclosure.

If the situation of making the call to the external electronic device is determined in operation 1001, the electronic device 400 may confirm whether information indicating a wearing state of the external electronic device is stored in operation 1003. According to the various embodiments of the present disclosure, as shown in FIG. 11, an external electronic device connected to the electronic device 400 (by establishing an acknowledgement (ACK) link) (operation 1110) may have a sensor for determining whether it is worn on a user's body. According to one embodiment of the present disclosure, in case of a headset, a sensor may be included in a portion to be inserted to the user's body, and in case of a smart watch, a sensor (e.g., a touch sensor, a heartbeat sensor, a proximity sensor, or the like) may be included in a body rear portion, a band portion, or the like which can be in contact with the user's body. The external electronic device may collect sensing information (operation 1112), and may determine a state of being worn on the user's body (operation 1114). In addition, the external electronic device may transmit determination information to the electronic device 400 (operation 1116), and upon receiving this, the electronic device 400 may store the determination information (operation 1118). In this case, the electronic device 400 may receive the determination information transmitted by using a Bluetooth control command (e.g., an Extended AT-Command). In addition, the external electronic device may determine the state of being worn on the user's body on the basis of a sensor, a button, and RF data.

If it is confirmed in operation 1003 that information indicating the state of wearing the external electronic device is stored, the stored information may be used to confirm whether it is a state of wearing the connected external electronic device in operation 1005.

Figure 12:
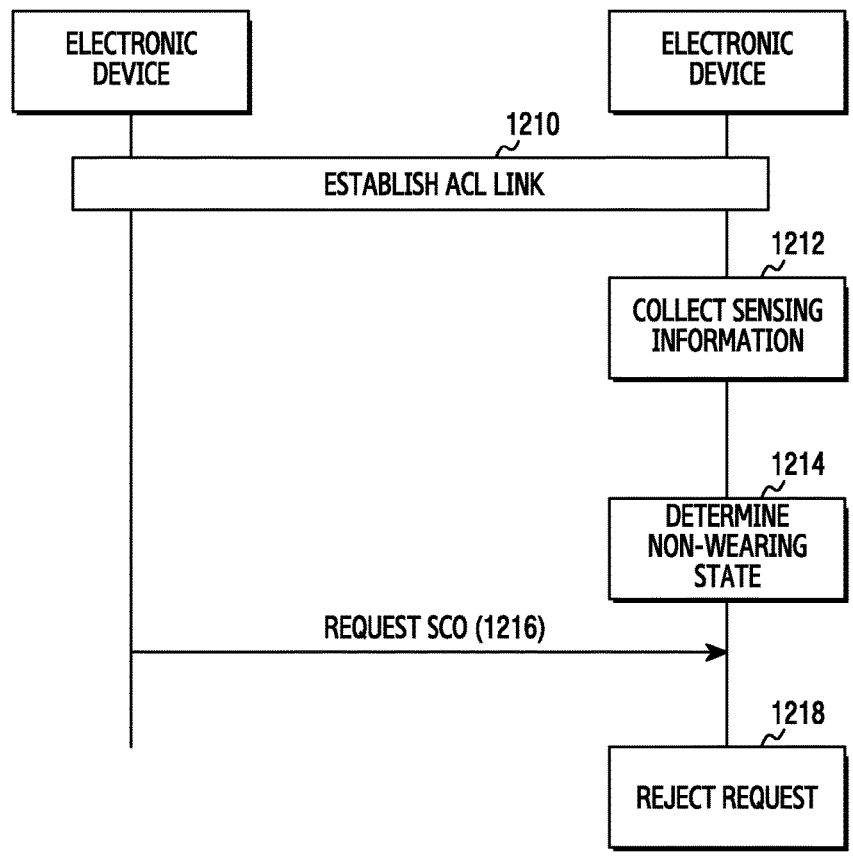
FIG. 12 illustrates a procedure of performing an operation of receiving a response in response to an establishment of a synchronization connection oriented (SCO) link from an external electronic device in an electronic device according to an embodiment of the present disclosure.

If it is confirmed in operation 1005 that it is the state of wearing the external electronic device, the electronic device 400 may request the external electronic device to establish a voice channel in operation 1007. According to one embodiment of the present disclosure, the electronic device 400 may request to establish a SCO link for voice communications, and thereafter may confirm whether a response for the voice channel request is received from the external electronic device in operation 1009. According to the various embodiments of the present disclosure, as shown in FIG. 12, an external electronic device connected to the electronic device 400 (by establishing an ACK link) (operation 1210) may collect sensing information through a sensor provided to determine whether it is worn on a user's body (operation 1212), and thus may determine a state of being not-worn on the user's body (operation 1214). In addition, the external electronic device may reject an SCO link establishment request 1216 received from the electronic device 400 in a state of determining that it is not worn on the user's body (operation 1218). That is, the external electronic device may not transmit a response in response to the request of the electronic device 400. In this case, the electronic device 400 may request to establish an SCO link by using a Bluetooth control command (e.g., an Extended AT-Command).

If a response is received in response to the voice channel request in operation 1009, the electronic device 400 may establish the voice channel with respect to the external electronic device in operation 1011. In this case, a call path is established with respect to the external electronic device, and the user may make a call to another electronic device 400 by using the external electronic device.

If it a situation of making a call to the electronic device 400 is determined in operation 1011, the electronic device 400 may not request to establish the voice channel in operation 1013. Alternatively, if information indicating a wearing state of the external electronic device is not stored in operation 1003 or if an external electronic device in a non-wearing state is confirmed in operation 1005, the electronic device 400 may not request to establish the voice channel in operation 1013.

In addition, if it is confirmed in operation 1009 that the response for the voice channel request is not received from the external electronic device or the voice channel establishment is not requested in operation 1013, the electronic device 400 may maintain a data channel established with respect to the external electronic device in operation 1015. In this case, a call path is established with respect to the electronic device 400, and the user may make a call to another electronic device by using the electronic device 400.

According to the various embodiments of the present disclosure, the electronic device 100 may report that the call path is established with respect to the external electronic device before establishing the voice channel with respect to the external electronic device, and may establish the call path in response to a detection of a user input for accepting this.

The electronic device 400 according to the various embodiments of the present disclosure may establish the voice channel with respect to the external electronic device in operation 1011, or may maintain the data channel with respect to the external electronic device in operation 1015, and thereafter may return to the procedure of FIG. 6.

Figure 13:
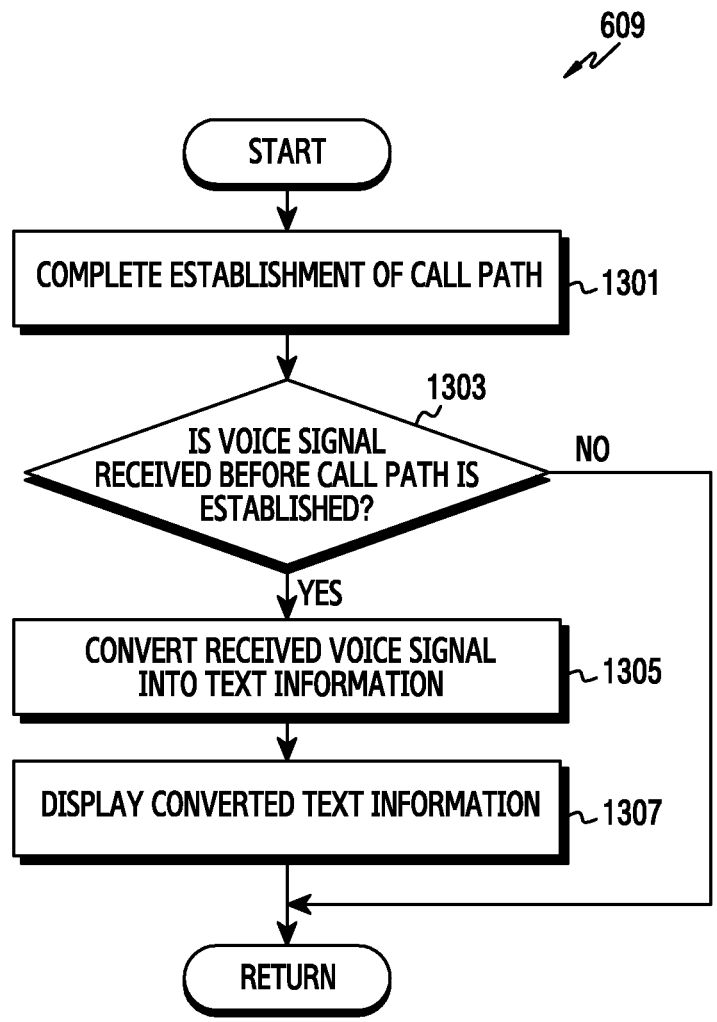
FIG. 13 is a flowchart illustrating a procedure of performing an operation of displaying text information for a voice signal on a screen in an electronic device according to an embodiment of the present disclosure.

FIG. 13 is a flowchart illustrating a procedure of performing an operation of displaying text information for a voice signal on a screen in the electronic device 400 according to an embodiment of the present disclosure. According to various embodiments of the present disclosure, the operation of displaying the text information for the voice signal may be a detailed operation of the operation 609 of FIG. 6.

Referring to FIG. 13, in operation 1301, the electronic device 400 may confirm whether a call path establishment is complete.

In operation 1303, the electronic device 400 may confirm whether a voice signal is received from another electronic device before the call path is established.

Figure 18:
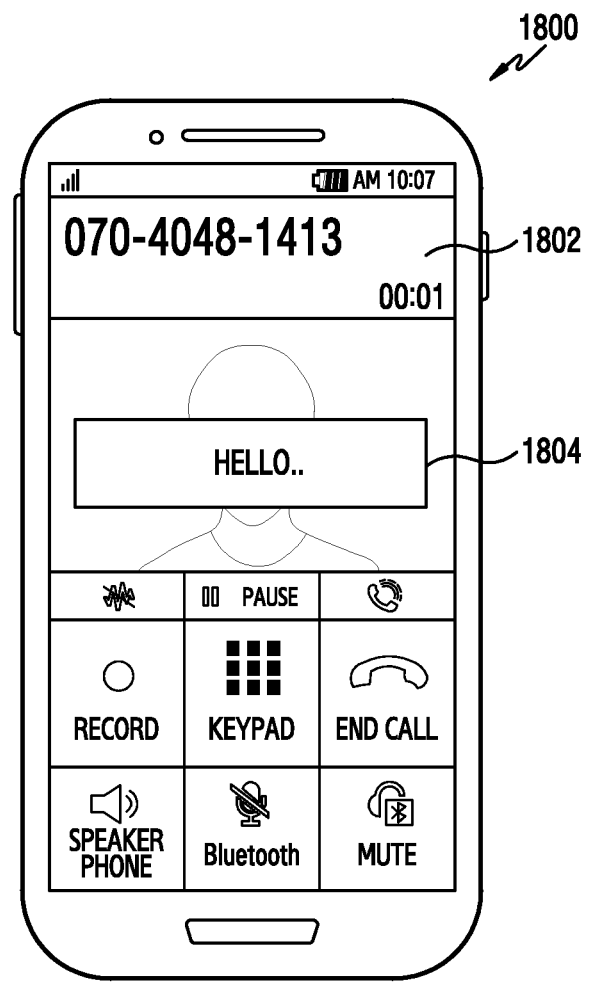
FIG. 18 illustrates an example of explaining a situation of providing a voice signal received before establishing a call path in a text format according to various embodiments of the present disclosure.

If it is confirmed in operation 1303 that the voice signal is received before the call path is established, the electronic device may convert the received voice signal into text information in operation 1305, and may display the converted text information to a screen in operation 1307. According to one embodiment of the present disclosure, the electronic device 400 may convert a voice signal received during a specific time period with respect to a time at which the call path is established into a text by using a voice recognition function (e.g., speech to text). That is, even if a call is made, the user of the electronic device 400 may not be able to listen to some parts of a voice of an opposite party when the call path is not established. In order to solve this problem, as shown in FIG. 18, the electronic device 400 may display a voice received before the call path is established after the call is made (see 1802) in a form of a text 1804 (see 1800).

The electronic device 400 according to the various embodiments of the present disclosure may display the text information on the screen in operation 1307, and thereafter may return to the procedure of FIG. 6. Alternatively, if it is confirmed in operation 1303 that the voice signal is not received before the call path is established, the electronic device 400 may return to the procedure of FIG. 6.

According to various embodiments of the present disclosure, a method of controlling a sound output of an electronic device may include connecting to at least one external electronic device, detecting at least one piece of sensor data, and selecting a device for outputting a sound from at least one of: the electronic device, and the external electronic device, the selection made on the basis of at least one of: the detected at least one piece of sensor data, and situation information of the at least one external electronic device, in a state of being connected to the at least one external electronic device.

According to the various embodiments of the present disclosure, the selecting of the device for outputting the sound may include selecting the device for outputting the sound from at least one of: the speaker, and the external electronic device, the selection made on the basis of at least one of: the detected at least one piece of sensor data, and the situation information of the external electronic device.

According to the various embodiments of the present disclosure, the connecting to the at least one external electronic device may include connecting through a short-distance wireless communication scheme by using at least one of non-cellular modules.

According to the various embodiments of the present disclosure, the at least one piece of sensor data may include data related to at least one sensor among a gesture sensor, a gyro sensor, an acceleration sensor, a proximity sensor, a bio sensor, an illumination sensor, a magnetic sensor, a grip sensor, and a RGB sensor.

According to the various embodiments of the present disclosure, the method of controlling the sound output may further include receiving the situation information of the at least one external electronic device from the at least one external electronic device connected to the electronic device.

According to the various embodiments of the present disclosure, the method of controlling the sound output may further include skipping an attempt to establish a link for voice communications with the external electronic device in response to the selection of the electronic device as the device for outputting the sound.

According to the various embodiments of the present disclosure, the method of controlling the sound output may include attempting to establish a link for voice communications with the external electronic device in response to the selection of the external electronic device as the device for outputting the sound.

According to the various embodiments of the present disclosure, the selecting of the device for outputting the sound may include selecting the electronic device as the device for outputting the sound in response to the detection of the sensor data related to a calling situation using the electronic device.

According to the various embodiments of the present disclosure, the calling situation using the electronic device may relate to at least one of a situation in which the electronic device is gripped by a user, a situation in which the electronic device moves to a user's body, and a situation in which a gesture is made to attempt to make a call.

According to the various embodiments of the present disclosure, the selecting of the device for outputting the sound may include selecting the electronic device as the device for outputting the sound in response to a collection of information related to a situation in which a user does not wear the external electronic device that can be worn on a user's body.

According to the various embodiments of the present disclosure, the selecting of the device for outputting the sound may include selecting the at least one device for outputting the sound on the basis of Bluetooth COD information among situation information collected from the at least one external electronic device.

According to the various embodiments of the present disclosure, the method of controlling the sound output may further include converting a received voice signal in a text format before selecting the device for outputting the sound, and displaying the signal through a display.

According to the various embodiments of the present disclosure, a computer readable recording medium may store a program for executing operations of establishing a communication link with respect to at least one external electronic device, detecting at least one piece of sensor data, and selecting at least one device for outputting a sound from at least one of: the electronic device, and the external electronic device, the selection made on the basis of at least one of: the detected at least one piece of sensor data, and situation information of the at least one external electronic device, in a state of being connected to the at least one external electronic device.

An electronic device and an operating method thereof according to various embodiments of the present disclosure may determine at least one device among an electronic device and an external electronic device connected to the electronic device and then output a sound in association with a situation, on the basis of at least one of: situation information of the electronic device, and the external electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a transceiver configured to establish a communication link for voice communication, to at least one external electronic device;
a sensor configured to detect at least one piece of sensor data; and
at least one processor configured to:
select at least one device for outputting a sound from at least one of the electronic device or the at least one external electronic device,
establish, based on the selecting, the communication link to the at least one external electronic device,
determine, during the establishing, that voice communication is received by the electronic device before the communication link is established,
convert, based on the determining, the voice communication from an audio format to a different format,
store the converted voice communication, and
display the converted voice communication,
wherein the selection is on a basis of at least one of:
the at least one piece of sensor data, or
when in a state of being connected to the electronic device, situation information of the at least one external electronic device.

2. The electronic device of claim 1, further comprising a speaker configured to output a sound,
wherein the at least one processor is further configured to select the at least one device for outputting the sound from at least one of the speaker, or the at least one external electronic device, and
wherein the selection is made on a further basis of:
the at least one piece of sensor data, and
the situation information.

3. The electronic device of claim 1,
wherein the transceiver comprises at least one of a cellular module or a non-cellular transceiver, and
wherein the transceiver is further configured to connect to the at least one external electronic device by using the non-cellular transceiver through a short-distance wireless communication scheme.

4. The electronic device of claim 1, wherein the transceiver is further configured to receive the situation information from the at least one external electronic device connected to the electronic device.

5. The electronic device of claim 1, wherein the at least one processor is further configured to refrain from attempting to establish a link for voice communication with the at least one external electronic device in response to a selection of the electronic device as the at least one device for outputting the sound.

6. The electronic device of claim 1, wherein the at least one processor is further configured to establish, in response to the selection of the at least one external electronic device as the device for outputting the sound, a link for voice communication with the at least one external electronic device.

7. The electronic device of claim 1, wherein the at least one processor is further configured to select, in response to the detection of the sensor data related to a calling situation using the electronic device, the electronic device as the at least one device for outputting the sound.

8. The electronic device of claim 1,
wherein the at least one external electronic device is a wearable device, and
wherein the at least one processor is further configured to select the electronic device as the at least one device for outputting the sound in response to a collection of information related to a situation in which a user does not wear the at least one external electronic device.

9. The electronic device of claim 1, wherein the at least one processor is further configured to select the at least one device for outputting the sound on a basis of bluetooth class of device (COD) information from among the situation information.

10. The electronic device of claim 1, further comprising a display,
wherein the converting comprises converting a received voice signal in the audio format into a text format before the selecting of the at least one device for outputting the sound, and
wherein the displaying comprises displaying the received voice signal in the text format on the display.

11. A method of controlling a sound output of an electronic device, the method comprising:
connecting to at least one external electronic device;
detecting at least one piece of sensor data;
selecting a device for outputting a sound from at least one of the electronic device or the at least one external electronic device;
establishing, based on the selecting, a communication link to the at least one external electronic device;
determining, during the establishing, that voice communication is received by the electronic device before the communication link is established;
converting, based on the determining, the voice communication from an audio format to a different format;
storing the converted voice communication; and
displaying the converted voice communication,
wherein the selection is on a basis of at least one of:
the detected at least one piece of sensor data, or
when in a state of being connected to the at least one external electronic device, situation information of the at least one external electronic device.

12. The method of claim 11,
wherein the selecting of the device for the outputting of the sound comprises selecting the device for outputting the sound from at least one of a speaker of the electronic device, or the at least one external electronic device, and wherein the selection is on a basis of at least one of:
the detected at least one piece of sensor data, or
the situation information.

13. The method of claim 11, wherein the connecting to the at least one external electronic device comprises connecting through a short-distance wireless communication scheme by using at least one non-cellular transceiver.

14. The method of claim 11, further comprising receiving the situation information from the at least one external electronic device connected to the electronic device.

15. The method of claim 11, further comprising, in response to the selection of the electronic device as the device for outputting the sound, refraining from attempting to establish a link for voice communication with the at least one external electronic device.

16. The method of claim 11, further comprising establishing a link for voice communication with the at least one external electronic device in response to the selection of the at least one external electronic device as the device for the outputting of the sound.

17. The method of claim 11, wherein the selecting of the device for the outputting of the sound comprises selecting, in response to the detection of the sensor data related to a calling situation using the electronic device, the electronic device as the device for outputting the sound.

18. The method of claim 11, wherein the selecting of the device for outputting the sound comprises selecting, in response to a collection of information related to a situation in which a user does not wear the at least one external electronic device that can be worn on a user's body, the electronic device as the device for outputting the sound.

19. The method of claim 11, wherein the selecting of the device for outputting the sound comprises selecting the at least one device for outputting the sound on a basis of bluetooth class of device (COD) information from among the situation information.

20. The method of claim 11, further comprising converting a received voice signal into a text format before selecting the device for outputting the sound, and displaying the received voice signal in the text format through a display.

* * * * *